(12) United States Patent
Kurokawa et al.

(10) Patent No.: US 7,986,216 B2
(45) Date of Patent: Jul. 26, 2011

(54) SEMICONDUCTOR DEVICE

(75) Inventors: Yoshiyuki Kurokawa, Sagamihara (JP);
Takayuki Ikeda, Atsugi (JP); Masami Endo, Atsugi (JP); Hiroki Dembo, Isehara (JP); Daisuke Kawae, Isehara (JP); Takayuki Inoue, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1070 days.

(21) Appl. No.: 11/812,618

(22) Filed: Jun. 20, 2007

(65) Prior Publication Data
US 2008/0001825 A1    Jan. 3, 2008

(30) Foreign Application Priority Data
Jun. 29, 2006 (JP) ................... 2006-178934

(51) Int. Cl.
*H04Q 5/22* (2006.01)

(52) U.S. Cl. ........................... 340/10.1; 455/73

(58) Field of Classification Search ............... 340/10.1, 340/825
See application file for complete search history.

(56) References Cited

U.S. PATENT DOCUMENTS

| 7,245,513 | B2 | 7/2007 | Watanabe et al. | |
|---|---|---|---|---|
| 2004/0072552 | A1* | 4/2004 | Park et al. | 455/334 |
| 2005/0168339 | A1* | 8/2005 | Arai et al. | 340/572.8 |
| 2005/0185737 | A1 | 8/2005 | Yamauchi | |

FOREIGN PATENT DOCUMENTS

| CN | 1767342 | 5/2006 |
|---|---|---|
| JP | 2001-244836 | 9/2001 |
| JP | 2005-346622 | 12/2005 |

OTHER PUBLICATIONS

Search Report (Application No. 07011617.3) dated Aug. 12, 2009.
Chinese Office Action (Application No. 200710127902.1) dated Aug. 6, 2010.

* cited by examiner

*Primary Examiner* — Brian A Zimmerman
*Assistant Examiner* — Sara Samson
(74) *Attorney, Agent, or Firm* — Eric J. Robinson; Robinson Intellectual Property Law Office, P.C.

(57) ABSTRACT

In a case where an ASK method is used for a communication method between a semiconductor device and a reader/writer, the amplitude of a radio signal is changed by data transmitted from the semiconductor device to the reader/writer when data is not transmitted from the reader/writer to the semiconductor device. Therefore, in some cases, the semiconductor device mistakes data transmitted from the semiconductor device itself for data transmitted from the reader/writer to the semiconductor device. The semiconductor device includes an antenna circuit, a transmission circuit, a reception circuit, and an arithmetic processing circuit. The antenna circuit transmits and receives a radio signal. The transmission circuit outputs to the reception circuit a signal showing whether or not the antenna circuit is transmitting the radio signal.

22 Claims, 23 Drawing Sheets

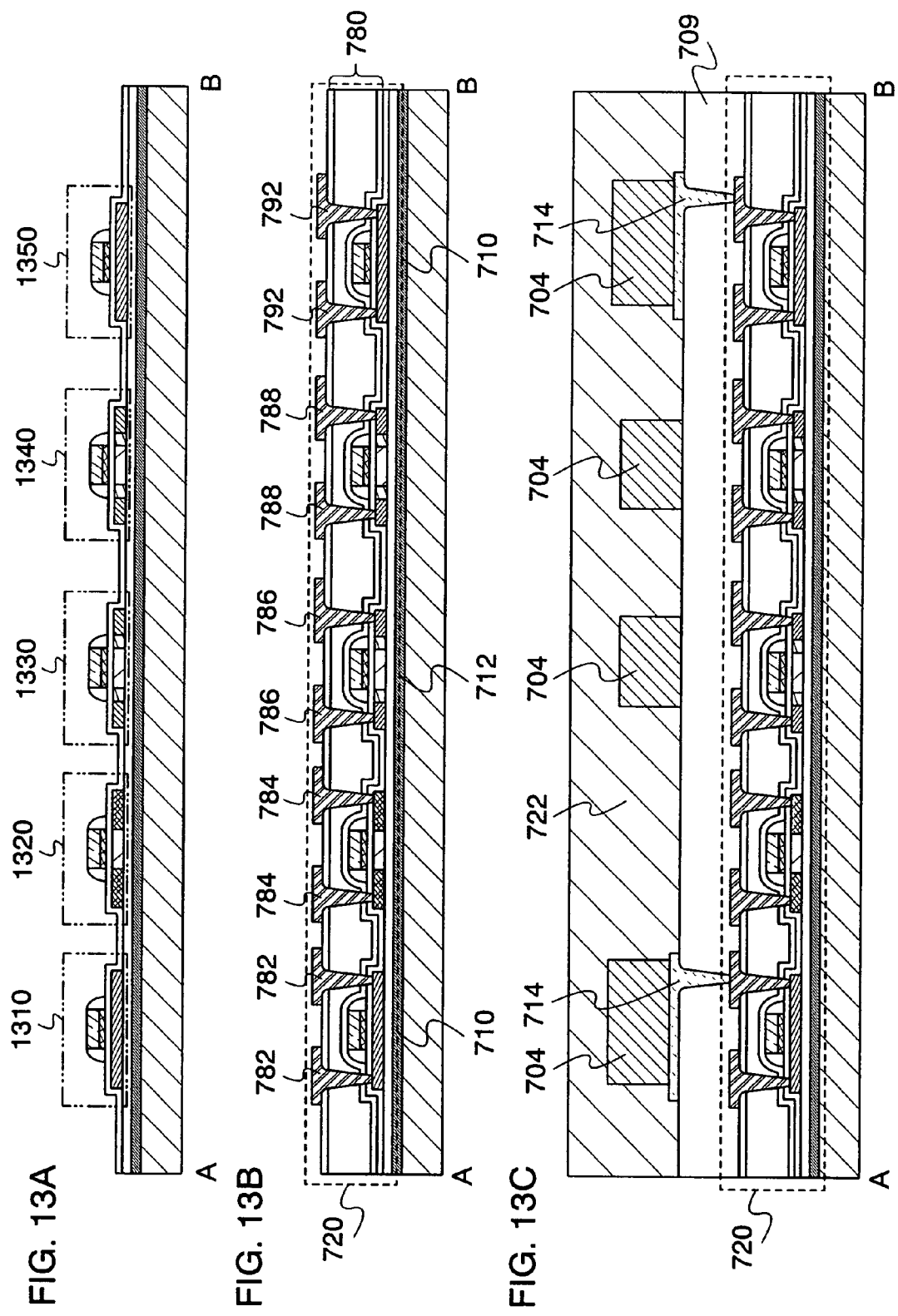

SEMICONDUCTOR DEVICE

BACKGROUND OF THE INVENTION

1. Field of the Invention

The present invention relates to a semiconductor device which transmits and receives data by wireless communication and particularly relates to a semiconductor device which uses an amplitude modulation method for data transmission.

2. Description of the Related Art

In recent years, a small semiconductor device in which a small IC chip and an antenna for wireless communication are combined (hereinafter also referred to as a semiconductor device or an RF chip; and also called an RFID tag, a wireless tag, an ID tag, an IC tag, or an RF tag) has attracted attention. The semiconductor device can transmit and receive data without contact, for example, write data or read data, by transmission and reception of a radio signal (operating magnetic field) with use of a wireless communication device (hereinafter referred to as a reader/writer).

As an application field of a semiconductor device which transmits and receives data by wireless communication, product management in the distribution industry is given as an example. Product management using a bar code and the like is the mainstream at present; however, since bar codes are read optically, data cannot be read in some cases when there is an interrupting object. On the other hand, when data is transmitted and received without contact with use of a wireless communication device, data of the semiconductor device is read wirelessly; thereby, data can be read even when there is an interrupting object. Thus, improvement in efficiency, cost reduction, and the like of product management are expected. Further, wide range of applications including boarding passes, airplane tickets, and automatic payment of fares are expected (e.g., see Reference 1: Japanese Published Patent Application No. 2005-346622). A system such that people and objects are managed and identified by a small semiconductor device which transmits and receives data by wireless communication is called RFID (Radio Frequency IDentification), and has attracted attention as fundamental technology of the IT society.

As standards of communication using RFIDs, ISO/IEC 15693 and the like are established, for example. According to ISO/IEC 15693, a frequency of 13.56 MHz±7 kHz is used for a carrier wave in a radio signal, and an ASK (Amplitude Shift Keying) method is used for transmitting and receiving data between a reader/writer and a semiconductor device.

FIG. 2 shows an example of a radio signal when data is transmitted and received between a reader/writer and a semiconductor device in the ASK method. In FIG. 2, a radio signal 201 is an electromagnetic wave which oscillates at the frequency of a carrier wave. Data transmitted from the radio signal 201 is represented by an envelope 202 of the amplitude of the radio signal 201. Hereinafter, the maximum amplitude of the radio signal 201 is represented as "W", and the minimum amplitude thereof is represented as "N" for simplification. For example, when the semiconductor device receives data transmitted from the reader/writer, a value of the data is identified in accordance with a predetermined encoding method depending on a state of occurrence of "N" in the radio signal 201. Specifically, the value of the data can be identified in accordance with a predetermined encoding method depending on timing, a period, the number of times, and the like of the occurrence of "N". Further, when the semiconductor device transmits data to the reader/writer, the radio signal 201 is modulated in accordance with a predetermined encoding method depending on the value of the data, and a state of occurrence of "N", specifically, timing, a period, the number of times, and the like of the occurrence of "N" can be changed. As an encoding method, a "one out of four" method established by ISO/IEC 15693 can be used, for example.

Note that data which is transmitted from the reader/writer to the semiconductor device includes a reset signal showing reset of a circuit in the semiconductor device, a SOF (Start Of Frame)/EOF (End Of Frame) signal showing start/end of data transmission from the reader/writer to the semiconductor device, a data signal to be transmitted to the semiconductor device, a synchronizing signal for synchronizing clock signals in the semiconductor device, a parity signal used for checking whether a data transmission error from the reader/writer to the semiconductor device occurs, and the like. Further, data which is transmitted from the semiconductor device to the reader/writer includes a SOF (Start Of Frame)/EOF (End Of Frame) signal showing start/end of data transmission from the semiconductor device to the reader/writer, a data signal to be transmitted to the reader/writer, and the like.

In such a data transmission method, the amplitude of the radio signal is changed by data transmitted from the semiconductor device to the reader/writer, even when data is not transmitted from the reader/writer to the semiconductor device. Therefore, in some cases, the semiconductor device mistakes data transmitted from the semiconductor device itself for data transmitted from the reader/writer.

SUMMARY OF THE INVENTION

In view of the foregoing problem, objects of the invention are to provide a semiconductor device of which malfunction is suppressed and reliability is improved, and in particular, to provide a semiconductor device with improved reliability, which does not mistake data transmitted from the semiconductor device itself to a reader/writer for data transmitted from the reader/writer.

A semiconductor device of the invention includes an antenna circuit, a transmission circuit, a reception circuit, and an arithmetic processing circuit. The antenna circuit in the semiconductor device of the invention transmits and receives a radio signal. Further, the antenna circuit has a function to generate a signal by rectifying a radio signal and output it to the transmission circuit; and a function to modulate the radio signal by a signal for modulation, which is input from the transmission circuit. The transmission circuit has a function to generate a signal for modulation from transmitted data output from the arithmetic processing circuit and output it to the antenna circuit; and also a function to output a signal showing whether or not data is being transmitted from the semiconductor device to the reader/writer, that is, a signal showing whether or not the radio signal is being transmitted from the antenna circuit to the reader/writer. The reception circuit has a function to generate a demodulation signal from a signal obtained by rectifying the radio signal, which is input from the antenna circuit, and the signal showing whether or not data is being transmitted, which is input from the transmission circuit, and output the demodulation signal to the arithmetic processing circuit. The arithmetic processing circuit has a function to perform arithmetic processing using the demodulation signal input from the reception circuit and output transmitted data to the transmission circuit. In the invention, the transmission circuit outputs to the reception circuit the signal showing whether or not data is being transmitted from the semiconductor device to the reader/writer. The reception circuit has a function to generate a demodulation signal from a rectified signal, which is input from the antenna circuit, and the signal showing whether or not data is being transmitted, which is input from the transmission circuit. When a state signal showing that data is being transmitted from the semiconductor device to the reader/writer is input to the reception circuit, the reception circuit outputs a certain signal independent of a rectified signal. Such a structure can prevent the semiconductor device from mistaking data transmitted from the semiconductor device itself to the reader/writer as data transmitted from the reader/writer.

According to a structure of the invention disclosed in this specification, a semiconductor device includes an antenna circuit which transmits and receives a radio signal, a transmission circuit, a reception circuit, and an arithmetic processing circuit. The transmission circuit outputs to the reception circuit a signal showing whether or not the antenna circuit is transmitting the radio signal.

According to another structure of the invention disclosed in this specification, a semiconductor device includes an antenna circuit which transmits and receives a radio signal, a transmission circuit, a reception circuit, and an arithmetic processing circuit. The transmission circuit outputs to the reception circuit a signal showing whether or not the antenna circuit is transmitting the radio signal. When a signal showing that the antenna circuit is transmitting the radio signal is input from the transmission circuit to the reception circuit, the reception circuit outputs to the arithmetic processing circuit a signal showing that the antenna circuit is not receiving the radio signal regardless of a signal from the antenna circuit.

In another structure of the invention, the antenna circuit can include an antenna, a resonant capacitor, a modulation resistor, and a rectifier circuit.

The antenna may be a coil antenna or a dipole antenna.

The modulation resistor may include an n-channel transistor or a p-channel transistor.

The rectifier circuit may be a full-wave rectifier circuit or a half-wave rectifier circuit.

The semiconductor device of the invention may be formed using a thin film transistor including a semiconductor film which is formed over a substrate having an insulating surface.

Note that the substrate having the insulating surface is preferably any of a glass substrate, a quartz substrate, a plastic substrate, and an SOI substrate.

In this specification, a wireless communication device includes a semiconductor device and a means to transmit and receive information by wireless communication, for example, may have one or both of functions to read information and to write information, and is referred to a reader/writer.

According to the invention, operational reliability of the semiconductor device can be improved, and a high-performance semiconductor device can be provided. In particular, the semiconductor device can be prevented from mistaking data transmitted from the semiconductor device itself to the reader/writer as data transmitted from the reader/writer to the semiconductor device. Thus, malfunction of the semiconductor device can be suppressed, and the semiconductor device with improved reliability can be provided.

BRIEF DESCRIPTION OF THE DRAWINGS

FIGS. 13A to 13C show an example of a manufacturing method of a semiconductor device of the invention.

DETAILED DESCRIPTION OF THE INVENTION

Figure 1:
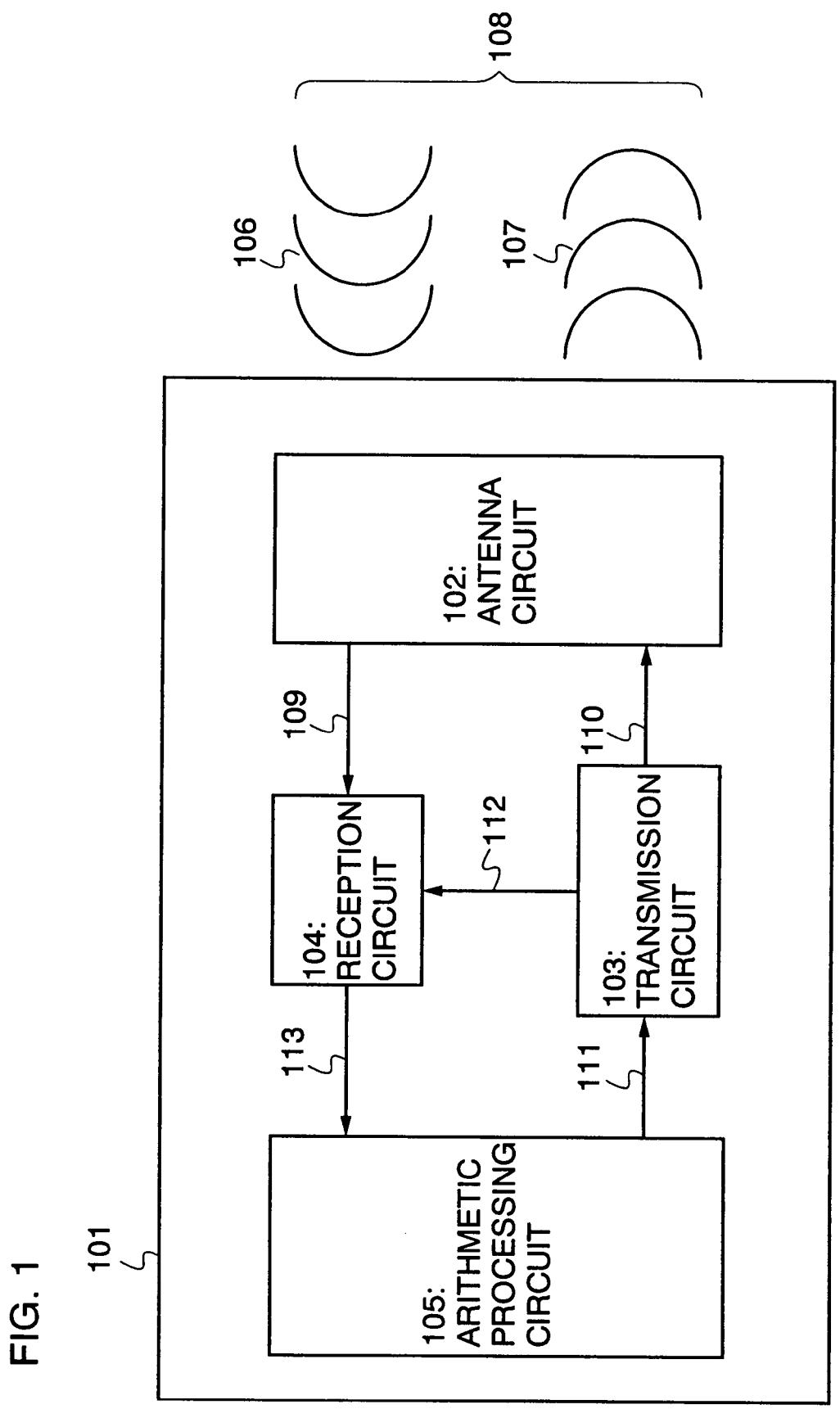
FIG. 1 is a schematic diagram of a semiconductor device of the invention.
Figure 2:
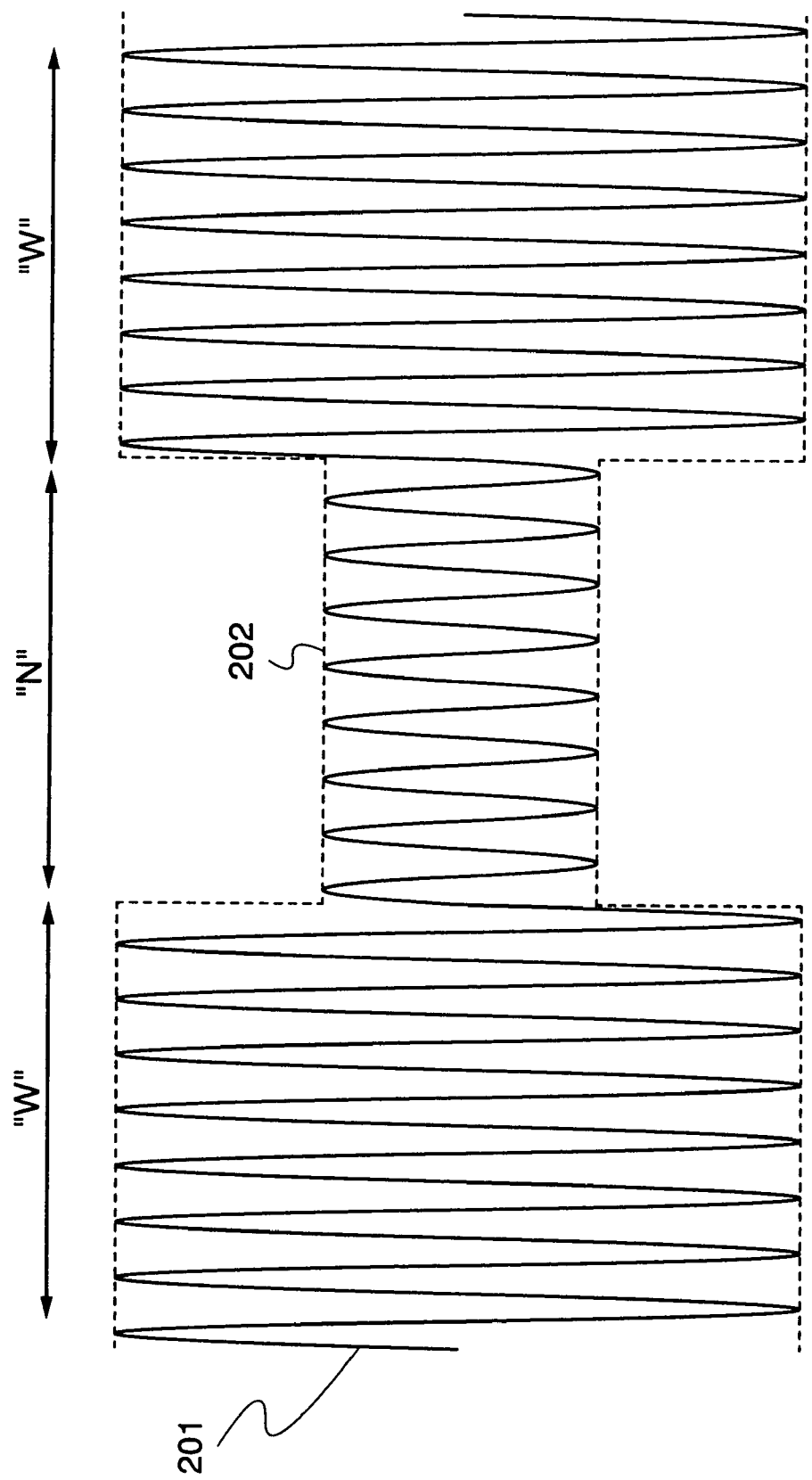
FIG. 2 shows an example of a radio signal when data is transmitted and received in the ASK method.

Hereinafter, an embodiment mode and embodiments of the present invention will be described with reference to drawings. However, the present invention can be embodied in many different modes and it is easily understood by those skilled in the art that modes and details can be variously changed without departing from the scope and the spirit of the present invention. Therefore, the present invention is not construed as being limited to description of the embodiment mode and embodiments. Note that in all the drawings for describing the embodiment mode and embodiments, the same portions or portions having similar functions are denoted by the same reference numerals, and repeated description is omitted.

Figure 3:
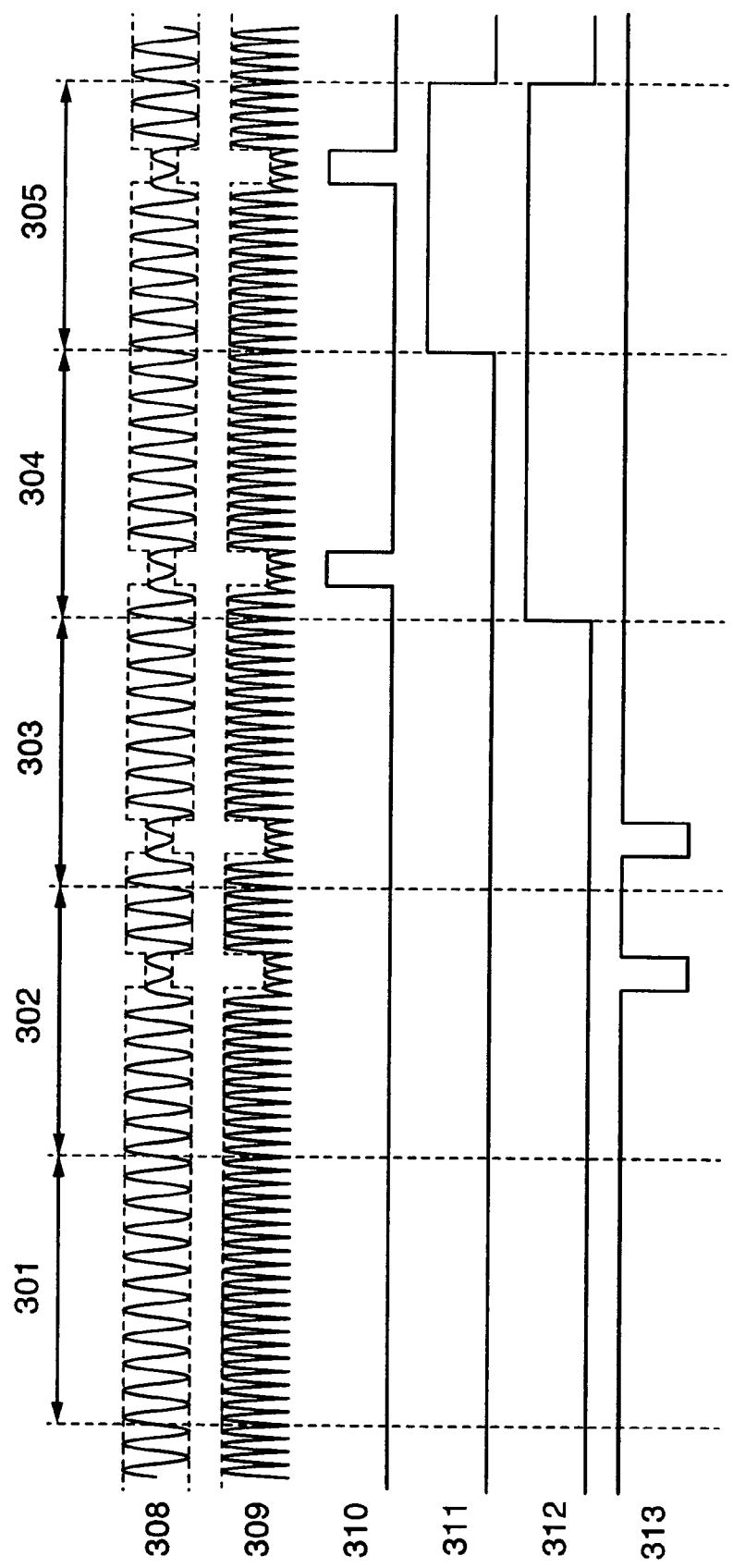
FIG. 3 shows an example of a timing chart of a semiconductor device of the invention.

In this embodiment mode, a semiconductor device in the invention is described with reference to FIGS. 1 and 3. FIG. 1 shows a hardware structure of a semiconductor device in the invention. FIG. 3 is a timing chart of each signal of the semiconductor device in the invention shown in FIG. 1.

In FIG. 1, a semiconductor device 101 includes an antenna circuit 102, a transmission circuit 103, a reception circuit 104, and an arithmetic processing circuit 105. Note that in FIG. 1, a received signal 106 and a transmitted signal 107 are shown as different signals for simplification of description; however, in fact, both of the signals overlap each other and are simultaneously transmitted and received between the semiconductor device 101 and a reader/writer. In this embodiment mode, both the received signal 106 and the transmitted signal 107 may be referred to as a radio signal 108. In FIG. 1, the reader/writer is omitted.

The antenna circuit 102 transmits and receives the radio signal 108, in other words, receives the received signal 106 from the reader/writer and transmits the transmitted signal 107 to the reader/writer. Further, the antenna circuit 102 has a function to rectify the received signal 106 received from the reader/writer to generate a smoothed signal 109 (hereinafter referred to as a rectified signal 109), and a function to modulate a signal to be transmitted to the reader/writer to generate the transmitted signal 107. At this time, the antenna circuit 102 modulates the signal to be transmitted to the reader/writer in accordance with a modulation signal 110 input from the transmission circuit 103.

For example, the antenna circuit 102 can include an antenna, a resonant capacitor, a modulation resistor, and a rectifier circuit. A resonant circuit can include the antenna and the resonant capacitor. In this case, the received signal 106 received from the reader/writer can be converted into an alternating current electrical signal by the resonant circuit included in the antenna circuit 102, and the alternating current electrical signal can be rectified and smoothed to be converted into the rectified signal 109 by the rectifier circuit. As the rectifier circuit, a full-wave rectifier circuit can be employed. A value of the modulation resistor is changed in accordance with the modulation signal 110 input from the transmission circuit 103, so that the transmitted signal 107 to be transmitted to the reader/writer can be generated.

The transmission circuit 103 has a function to generate a signal 110 (hereinafter referred to as the modulation signal 110) for modulating the signal to be transmitted to the reader/writer from transmitted data 111 input from the arithmetic processing circuit 105 and output the modulation signal 110 to the antenna circuit 102. Note that the transmitted data 111 is an arithmetic processing result by the arithmetic processing circuit 105. For example, the transmission circuit 103 converts the transmitted data 111 into the modulation signal 110 in accordance with a predetermined data encoding method. For example, in a case where a high-speed mode of a single subcarrier established by ISO/IEC 15693 is used as a modulation method, when the transmitted data 111 is "L", as the modulation signal 110, eight pulses of a pulse signal with 423.75 kHz are first generated and then a period of "H" is generated for 18.88 μs. When the transmitted data 111 is "H", as the modulation signal 110, "H" is generated for the first 18.88 μs, and then eight pulses of the pulse signal with 423.75 kHz are generated.

In addition, the transmission circuit 103 has a function to output to the reception circuit 104 a signal 112 (hereinafter referred to as a state signal 112) showing whether or not the semiconductor device 101 is transmitting data, that is, whether or not the antenna circuit 102 is transmitting the transmitted signal 107. For example, the transmission circuit 103 can output "H" as the state signal 112 when the semiconductor device 101 is transmitting data, and output "L" as the state signal 112 when the semiconductor device 101 is not transmitting data.

Here, the description that the signal is L means that a potential of the signal is a first potential, for example, a low potential. The description that the signal is H means that a potential of the signal is a second potential, for example, a higher potential than a case where the signal is "L".

The reception circuit 104 has a function to generate a signal 113 (hereinafter referred to as a demodulation signal 113) in which data included in the received signal 106 is demodulated from the rectified signal 109, from the rectified signal 109 input from the antenna circuit 102 and the state signal 112 input from the transmission circuit 103 when the reception circuit 104 receives the received signal 106 from the reader/writer. Note that when the reception circuit 104 is not receiving the received signal 106 from the reader/writer, a certain signal which is not demodulated is output as the demodulation signal 113 regardless of the rectified signal 109. Here, a case is described in which "L" as the state signal 112 is input from the transmission circuit 103 when the semiconductor device 101 is not transmitting data; and "H" as the state signal 112 is input from the transmission circuit 103 when the semiconductor device 101 is transmitting data. When "L" as the state signal 112 is input to the reception circuit 104, the reception circuit 104 generates the demodulation signal 113 by demodulating the rectified signal 109. On the other hand, when "H" as the state signal 112 is input to the reception circuit 104, the reception circuit 104 generates the certain demodulation signal 113 which is not demodulated, regardless of the rectified signal 109.

The reception circuit 104 can include, for example, a low-pass filter and a control circuit for performing logical OR operation. In this case, by the low-pass filter included in the reception circuit 104, the rectified signal 109 input from the antenna circuit 102 can be converted into a signal (hereinafter referred to as a second demodulation signal) in which data included in the received signal 106 or the transmitted signal 107 is demodulated. In the control circuit, by performing logical OR operation between the second demodulation signal converted from the rectified signal 109 and the state signal 112 input from the transmission circuit 103, the demodulation signal 113 in which the data included in the received signal 106 is demodulated or the certain demodulation signal 113 which is not demodulated can be generated.

The arithmetic processing circuit 105 has a function to determine from the demodulation signal 113 input from the reception circuit 104 whether data in which the semiconductor device 101 receives is data transmitted from the reader/writer or data transmitted from the semiconductor device 101 itself, perform arithmetic processing, and generate the transmitted data 111. The arithmetic processing circuit 105 includes, for example, a CPU, a ROM, a RAM, a dedicated circuit, or the like, performs arithmetic processing such as code processing and acquisition of an ID number, and generates the transmitted data 111 as an arithmetic processing result.

Hereinafter, an example of operation of the semiconductor device 101 shown in FIG. 1 is described with reference to FIG. 3. A first signal 308 corresponds to the radio signal 108 in FIG. 1. A second signal 309 corresponds to the rectified signal 109 in FIG. 1. A third signal 310 corresponds to the modulation signal 110 in FIG. 1. A fourth signal 311 corresponds to the transmitted data 111 in FIG. 1. A fifth signal 312 corresponds to the state signal 112 in FIG. 1. A sixth signal 313 corresponds to the demodulation signal 113 in FIG. 1. In FIG. 3, a non-transmission/reception period 301, a first data reception period 302, a second data reception period 303, a first data transmission period 304, and a second data transmission period 305 are shown by arrows of solid lines.

In FIG. 3, the non-transmission/reception period 301 is when the amplitude of the first signal 308 is always at maximum, that is, a period of "W". The first data reception period 302 includes a period when the amplitude of the first signal 308 is always at minimum, that is, becomes "N", and is a period when the fifth signal 312 is "L". The second data reception period 303 includes a period when the first signal 308 becomes "N" with the timing different from that in the first data reception period 302 and is a period when the fifth signal 312 is "L". The first data transmission period 304 includes a period when the first signal 308 becomes "N", and is a period when the fifth signal 312 is "H". The second data transmission period 305 includes a period when the first signal 308 becomes "N" with the timing different from that in the first data transmission period 304 and is a period when the fifth signal 312 is "H".

Note that in this embodiment mode, as an encoding method for identifying data transmitted from the reader/writer, a "one out of four" method established by ISO/IEC 15693 is used. The "one out of four" method is one of pulse position modulation methods, by which a binary number is expressed by a position out of four positions to be modulated in a certain period.

The non-transmission/reception period 301 is when the reader/writer does not transmit data to the semiconductor device 101 and the semiconductor device 101 does not transmit data to the reader/writer. Accordingly, the amplitude of the radio signal 108 in FIG. 1 is always at maximum, that is, "W", and is like the first signal 308 in FIG. 3. At this time, the antenna circuit 102 in FIG. 1 generates the rectified signal 109 from the radio signal 108 and outputs it. Accordingly, the amplitude of the rectified signal 109 in FIG. 1 is always at maximum, that is, becomes "W" like the second signal 309 in FIG. 3. The transmission circuit 103 in FIG. 1 outputs "L" as the state signal 112 since the semiconductor device 101 is not transmitting data to the reader/writer. Accordingly, the state signal 112 in FIG. 1 is like the fifth signal 312 in FIG. 3. Further, the arithmetic processing circuit 105 in FIG. 1 outputs "L" also as the transmitted data 111 since the semiconductor device 101 is not transmitting data to the reader/writer. Accordingly, the transmitted data 111 in FIG. 1 is like the fourth signal 311 in FIG. 3. Further, the modulation signal 110 output from the transmission circuit 103 in FIG. 1 becomes "L" and is like the third signal 310 in FIG. 3. The reception circuit 104 in FIG. 1 performs logical OR operation between the rectified signal 109 and the state signal 112, and outputs "H" as the demodulation signal 113. Accordingly, the demodulation signal 113 in FIG. 1 is like the sixth signal 313 in FIG. 3. Note that the arithmetic processing circuit 105 determines from the demodulation signal 113 that the semiconductor device 101 does not receive data from the reader/writer, and does not perform special arithmetic processing. Note that the description of "special arithmetic processing" means arithmetic processing using data transmitted from the reader/writer.

Next, the first data reception period 302 is when the reader/writer transmits data to the semiconductor device 101. The radio signal 108 in FIG. 1 includes a period when the amplitude thereof becomes minimum. That is, the first signal 308 in FIG. 3 includes a period of "N". At this time, the antenna circuit 102 in FIG. 1 generates the rectified signal 109 from the radio signal 108 and outputs it. Accordingly, the rectified signal 109 in FIG. 1 includes a period of "N" corresponding to the first signal 308 (the radio signal 108 in FIG. 1), like the second signal 309 in FIG. 3. The transmission circuit 103 in FIG. 1 outputs "L" as the state signal 112 since the semiconductor device 101 is not transmitting data to the reader/writer. Accordingly, the state signal 112 in FIG. 1 is like the fifth signal 312 in FIG. 3. Further, the arithmetic processing circuit 105 in FIG. 1 outputs "L" also as the transmitted data 111 since the semiconductor device 101 is not transmitting data to the reader/writer. Accordingly, the transmitted data 111 in FIG. 1 is like the fourth signal 311 in FIG. 3. Further, the modulation signal 110 output from the transmission circuit 103 in FIG. 1 also becomes "L" and is like the third signal 310 in FIG. 3. The reception circuit 104 in FIG. 1 performs logical OR operation between the rectified signal 109 and the state signal 112, and outputs the demodulation signal 113. The demodulation signal 113 in FIG. 1 is like the sixth signal 313 in FIG. 3. Here, the sixth signal 313 in FIG. 3 outputs "L" corresponding to a period when the second signal 309 (the rectified signal 109 in FIG. 1) becomes "N". The arithmetic processing circuit 105 in FIG. 1 determines from the timing when the demodulation signal 113 becomes "L" that data transmitted from the reader/writer is "HL". Note that the arithmetic processing circuit 105 performs arithmetic processing as appropriate using the data "HL".

Next, the second data reception period 303 is when the reader/writer transmits data to the semiconductor device 101. In the second data reception period 303, the radio signal 108 in FIG. 1 includes a period when the amplitude thereof becomes minimum. That is, the first signal 308 in FIG. 3 includes a period of "N". Note that the second data reception period 303 includes a period when the first signal 308 becomes "N" similarly to the first data reception period 302 but with a different timing of becoming "N". At this time, the antenna circuit 102 in FIG. 1 generates the rectified signal 109 from the radio signal 108 and outputs it. Accordingly, the rectified signal 109 in FIG. 1 includes a period of "N" corresponding to the first signal 308 (the radio signal 108 in FIG. 1), like the second signal 309 in FIG. 3. The transmission circuit 103 in FIG. 1 outputs "L" as the state signal 112 since the semiconductor device 101 is not transmitting data to the reader/writer. Accordingly, the state signal 112 in FIG. 1 is like the fifth signal 312 in FIG. 3. Further, the arithmetic processing circuit 105 in FIG. 1 outputs "L" also as the transmitted data 111 since the semiconductor device 101 is not transmitting data to the reader/writer. Accordingly, the transmitted data 111 in FIG. 1 is like the fourth signal 311 in FIG. 3. Further, the modulation signal 110 output from the transmission circuit 103 in FIG. 1 also becomes "L" and is like the third signal 310 in FIG. 3. The reception circuit 104 in FIG. 1 performs logical OR operation between the rectified signal 109 and the state signal 112, and outputs the demodulation signal 113. Accordingly, the demodulation signal 113 in FIG. 1 is like the sixth signal 313 in FIG. 3. Here, the sixth signal 313 in FIG. 3 outputs "L" corresponding to a period when the second signal 309 (the rectified signal 109 in FIG. 1) becomes "N". The arithmetic processing circuit 105 in FIG. 1 determines from the timing when the demodulation signal 113 becomes "L" that data transmitted from the reader/writer is "LL". Note that the arithmetic processing circuit 105 performs arithmetic processing as appropriate using the data "LL".

Next, the first data transmission period 304 is when the semiconductor device 101 transmits data to the reader/writer. At this time, the transmission circuit 103 outputs the modulation signal 110 which is for modulating the radio signal 108. Note that the modulation signal 110 is generated by converting the transmitted data 111 input from the arithmetic processing circuit 105 in accordance with a predetermined data encoding method. In the first data transmission period 304 in FIG. 3, "L" is output as the transmitted data 111 in FIG. 1 and the transmitted data 111 is converted, so that the modulation signal 110 including a period of "H" with a certain timing is output. Accordingly, the transmitted data 111 in FIG. 1 is like the fourth signal 311 in FIG. 3. The modulation signal 110 in FIG. 1 is like the third signal 310 in FIG. 3.

Here, in the antenna circuit 102 in FIG. 1, the radio signal 108 is modulated by the modulation signal 110 input from the transmission circuit 103. Specifically, the radio signal 108 in FIG. 1 includes a period of "N" corresponding to output of "H" of the modulation signal 110. Accordingly, the first signal 308 in FIG. 3 includes a period of "N" corresponding to the output of "H" of the third signal 310. Further, in the antenna circuit 102 in FIG. 1, since the rectified signal 109 is generated from the radio signal 108, the rectified signal 109 includes a period of "N" corresponding to the first signal 308 (the radio signal 108 in FIG. 1), like the second signal 309 in FIG. 3.

Since the semiconductor device 101 is transmitting data to the reader/writer, the transmission circuit 103 in FIG. 1 outputs "H" as the state signal 112. Accordingly, the state signal 112 in FIG. 1 is like the fifth signal 312 in FIG. 3. Further, in the reception circuit 104 in FIG. 1, since the state signal 112 input from the transmission circuit 103 is "H", logical OR operation between the rectified signal 109 and the state signal 112 is "H" independent of the rectified signal 109. Accordingly, the reception circuit 104 outputs "H" as the demodulation signal 113, which is like the sixth signal 313 in FIG. 3. The arithmetic processing circuit 105 receives the demodulation signal 113 similar to that of the non-transmission/reception period 301, and determines that the semiconductor device 101 does not receive data from the reader/writer and does not perform special arithmetic processing. That is, although the radio signal 108 includes a period of "N", operation of the arithmetic processing circuit 105 is similar to that in the non-transmission/reception period 301.

Next, the second data transmission period 305 is when the semiconductor device 101 transmits data to the reader/writer. At this time, the transmission circuit 103 outputs the modulation signal 110 which is for modulating the radio signal 108. Note that the modulation signal 110 is generated by converting the transmitted data 111 input from the arithmetic processing circuit 105 in accordance with a predetermined data encoding method. In the second data transmission period 305 in FIG. 3, "H" is output as the transmitted data 111 in FIG. 1 and the transmitted data 111 is converted, so that the modulation signal 110 including a period of "H" with the timing different from that in the first data transmission period 304 is output. Accordingly, the transmitted data 111 in FIG. 1 is like the fourth signal 311 in FIG. 3. The modulation signal 110 in FIG. 1 is like the third signal 310 in FIG. 3. The third signal 310 in FIG. 3 includes a period of "H" with the timing different from that in the first data transmission period 304.

Here, in the antenna circuit 102 in FIG. 1, the radio signal 108 is modulated by the modulation signal 110 input from the transmission circuit 103. Specifically, the radio signal 108 in FIG. 1 includes a period of "N" corresponding to output of "H" of the modulation signal 110. Accordingly, the first signal 308 in FIG. 3 includes a period of "N" corresponding to the output of "H" of the third signal 310. Further, in the antenna circuit 102 in FIG. 1, since the rectified signal 109 is generated from the radio signal 108, the rectified signal 109 includes a period of "N" corresponding to the first signal 308 (the radio signal 108 in FIG. 1), like the second signal 309 in FIG. 3.

Since the semiconductor device 101 is transmitting data to the reader/writer, the transmission circuit 103 in FIG. 1 outputs "H" as the state signal 112. Accordingly, the state signal 112 in FIG. 1 is like the fifth signal 312 in FIG. 3. Further, in the reception circuit 104 in FIG. 1, since the state signal 112 input from the transmission circuit 103 is "H", logical OR operation between the rectified signal 109 and the state signal 112 is "H" independent of the rectified signal 109. Accordingly, the reception circuit 104 outputs "H" as the demodulation signal 113, which is like the sixth signal 313 in FIG. 3. The arithmetic processing circuit 105 receives the demodulation signal 113 similar to that in the non-transmission/reception period 301, and determines that the semiconductor device 101 does not receive data from the reader/writer and does not perform special arithmetic processing. That is, although the radio signal 108 includes a period of "N", operation of the arithmetic processing circuit 105 is similar to that in the non-transmission/reception period 301.

With the structure described above, a semiconductor device which does not mistake data transmitted from the semiconductor device itself to the reader/writer for data transmitted from the reader/writer can be provided. That is, operational reliability of the semiconductor device can be improved, and a high-performance semiconductor device can be provided.

Embodiment 1

Figure 4:
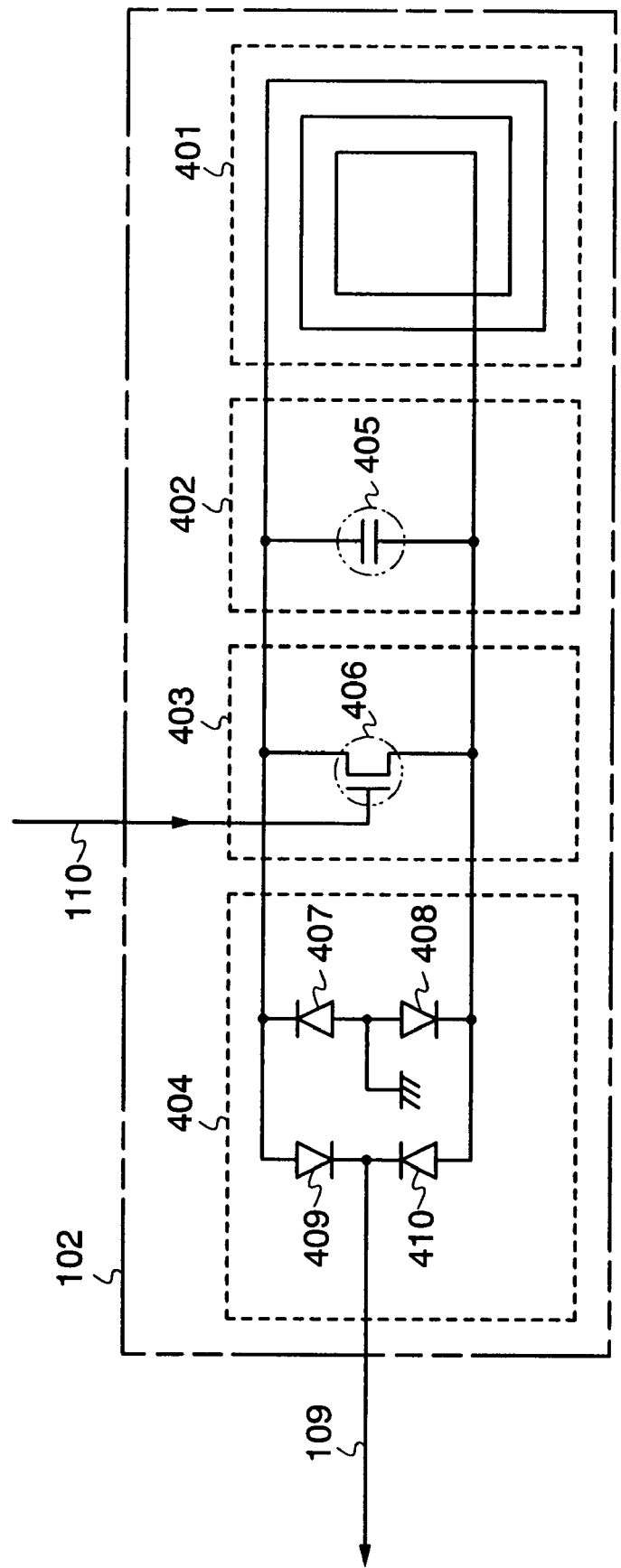
FIG. 4 is a circuit diagram showing an example of a circuit included in a semiconductor device of the invention.
Figure 5:
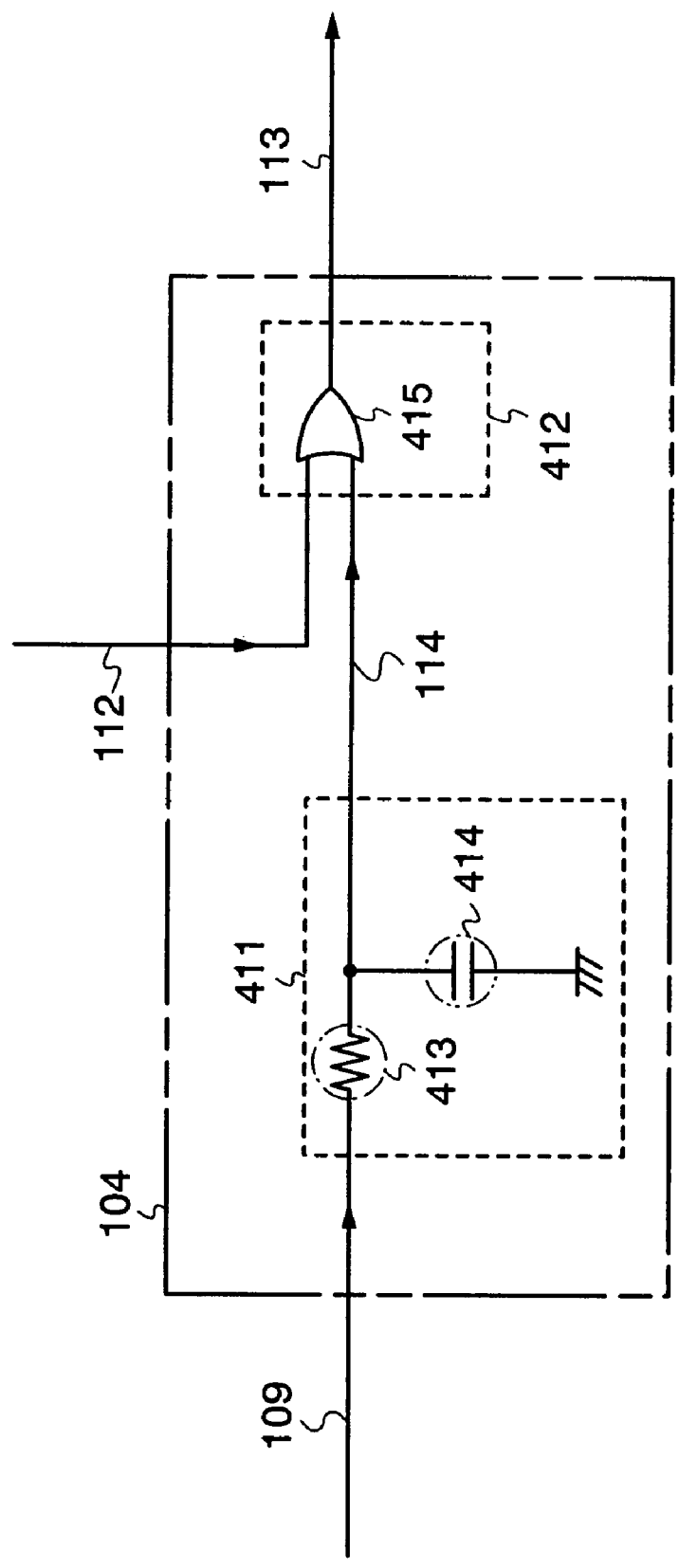
FIG. 5 is a circuit diagram showing an example of a circuit included in a semiconductor device of the invention.
Figure 6:
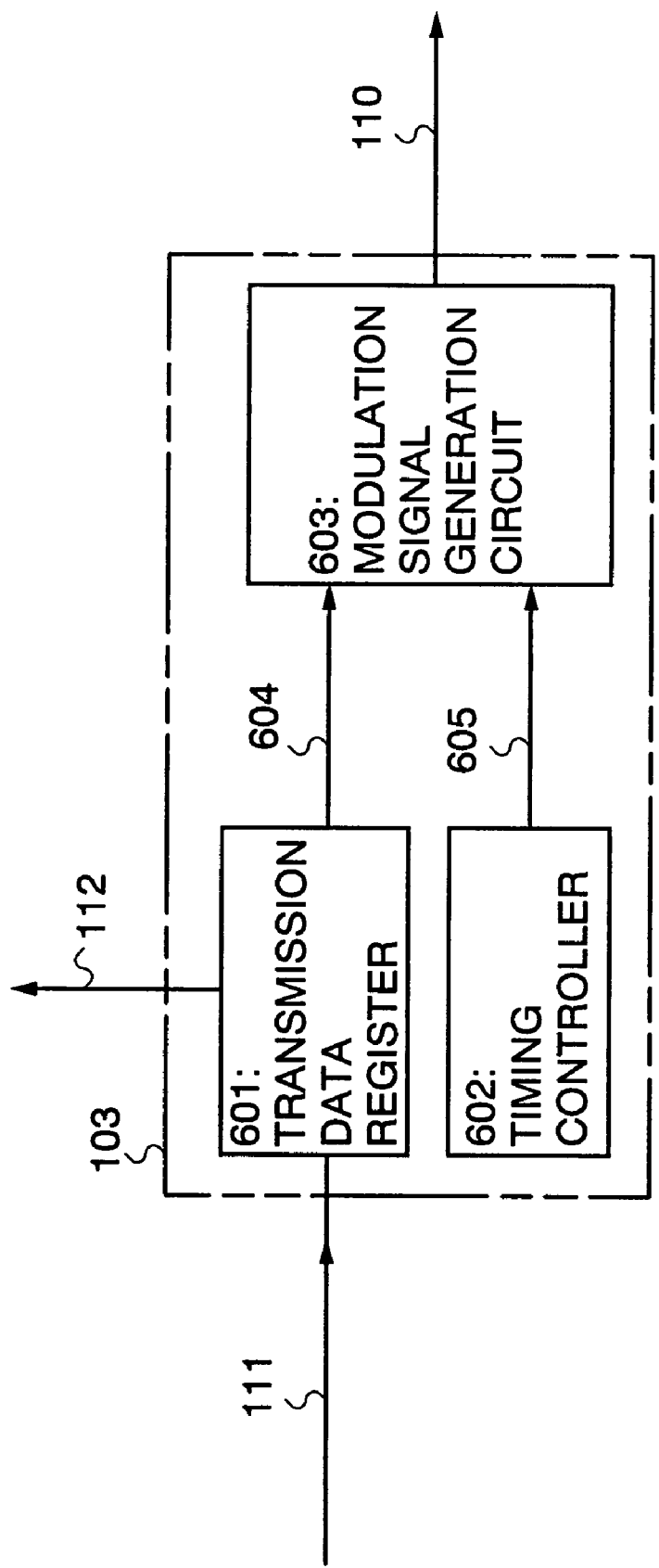
FIG. 6 is a circuit diagram showing an example of a circuit included in a semiconductor device of the invention.
Figure 7:
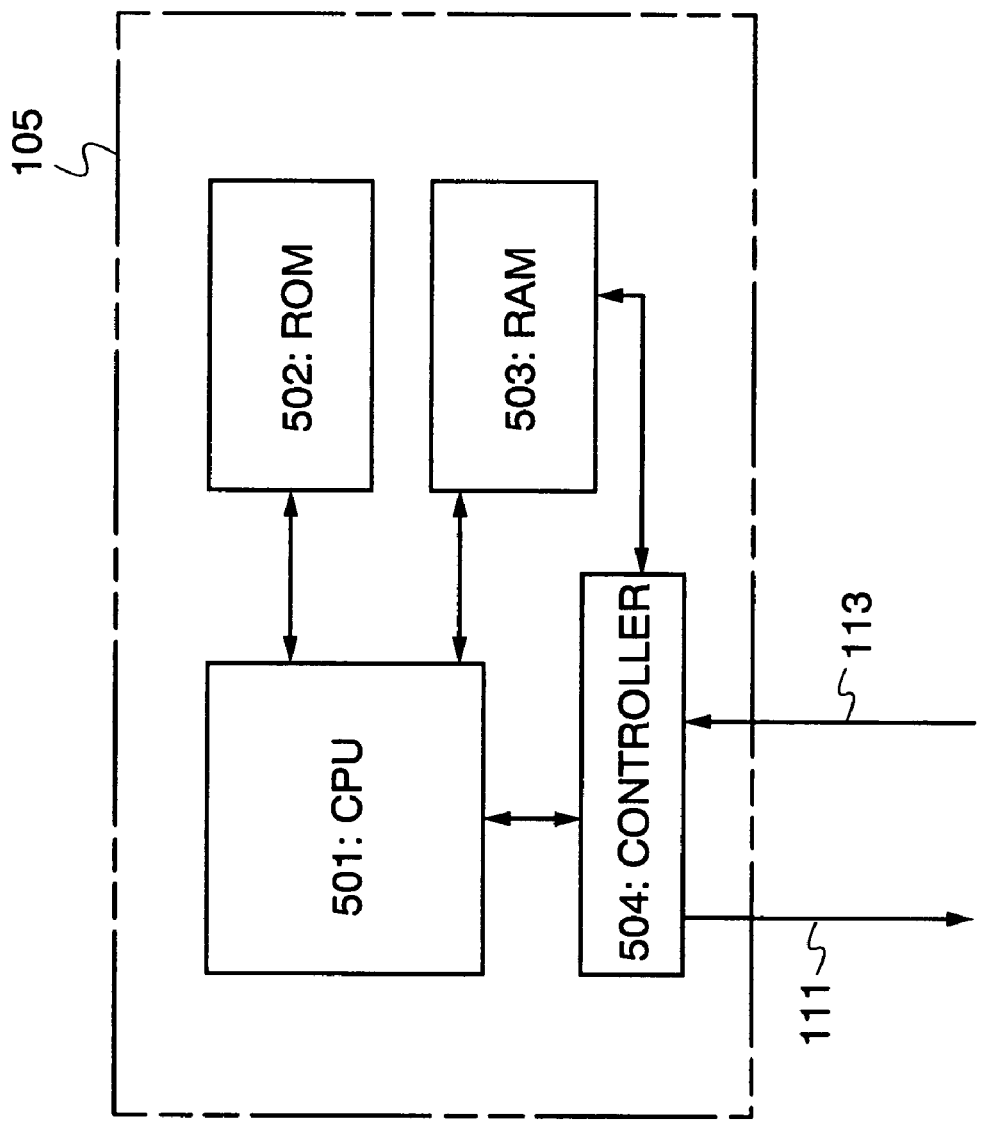
FIG. 7 is a circuit diagram showing an example of a circuit included in a semiconductor device of the invention.

In this embodiment, the circuits forming a semiconductor device of the invention, which are described in the embodiment mode, are described in detailed with reference to FIGS. 4 to 7. FIG. 4 shows an example of a circuit diagram of the antenna circuit 102 forming the semiconductor device of the invention. FIG. 5 shows an example of a circuit diagram of the reception circuit 104 forming the semiconductor device of the invention. FIG. 6 shows an example of a circuit diagram of the transmission circuit 103 forming the semiconductor device of the invention. FIG. 7 shows an example of a circuit diagram of the arithmetic processing circuit 105 forming the semiconductor device of the invention.

In FIG. 4, the antenna circuit 102 includes an antenna 401, a resonant capacitor 402, a modulation resistor 403, and a rectifier circuit 404. A coil antenna is shown here as the antenna 401; however, various modes such as a dipole antenna can be employed in accordance with a frequency band of a radio signal. The resonant capacitor 402 includes an electrical capacitor 405. A resonant circuit includes the antenna 401 and the resonant capacitor 402, and can convert a received signal (a radio signal) into an alternating current electrical signal.

The modulation resistor 403 includes an n-channel transistor 406. Here, when the modulation signal 110 input to the antenna circuit 102 is "H", a potential of a gate electrode of the n-channel transistor 406 becomes "H", and the transmitted signal (the radio signal) can be modulated. Note that the modulation resistor 403 can include a p-channel transistor. In this case, when the modulation signal 110 input to the antenna circuit 102 is "L", a potential of a gate electrode of the p-channel transistor becomes "L", and the transmitted signal (the radio signal) can be modulated.

The rectifier circuit 404 is a full-wave rectifier circuit, which includes a first diode 407, a second diode 408, a third diode 409, and a fourth diode 410. The rectifier circuit 404 converts the alternating current electrical signal generated in the resonant circuit into the rectified signal 109 which is a direct current electrical signal. Note that the rectifier circuit 404 can be a half-wave rectifier circuit easily.

In FIG. 5, the reception circuit 104 includes a low-pass filter 411 and a control circuit 412. The low-pass filter 411 includes an electrical resistor 413 and an electrical capacitor 414, and generates a potential in accordance with the potential amplitude of the rectified signal 109 input from the antenna circuit 102 and outputs a second modulation signal 114. The control circuit 412 includes an OR circuit 415. The control circuit 412 performs logical OR operation between the second modulation signal 114 and the state signal 112 input from the transmission circuit 103, and outputs the demodulation signal 113. Here, when the state signal 112 is "H", "H" is output as the demodulation signal 113 regardless of a potential of the second modulation signal 114.

In FIG. 6, the transmission circuit 103 includes a transmission data register 601, a timing controller 602, and a modulation signal generation circuit 603.

The transmission data register 601 has a function to sort the transmitted data 111 in accordance with order of data transmitted from the semiconductor device 101 to the reader/writer after storing all or a part of the transmitted data 111 input from the arithmetic processing circuit 105. Further, the transmission data register 601 has a function to sequentially output the sorted transmitted data 111 as modulation data 604 to the modulation signal generation circuit 603; and has a function to output "H" as the state signal 112 to the reception circuit 104 before outputting all of the stored transmitted data 111 as the modulation data 604.

The timing controller 602 has a function to generate a timing signal 605 output to the modulation signal generation circuit 603. For example, when the high-speed mode of the single subcarrier established by ISO/IEC 15693 is used as a data transmission method from the semiconductor device 101 to the reader/writer, a pulse signal with 423.75 kHz is generated as the timing signal 605.

The modulation signal generation circuit 603 has a function to generate the modulation signal 110 by using the modulation data 604 input from the transmission data register 601 and the timing signal 605 input from the timing controller 602. For example, a case is described in which the high-speed mode of the single subcarrier established by ISO/IEC 15693 is used as a data transmission method from the semiconductor device 101 to the reader/writer. When the modulation data 604 outputs "L", as the modulation signal 110, eight pulses of a pulse signal with 423.75 kHz are first generated and then "H" is generated for 18.88 µs. When the modulation data 604 outputs "H", as the modulation signal 110, "H" is generated for the first 18.88 µs and then eight pulses of the pulse signal with 423.75 kHz are generated.

In FIG. 7, the arithmetic processing circuit 105 includes a CPU 501, a ROM (Read Only Memory) 502, a RAM (Random Access Memory) 503, and a controller 504.

The controller 504 extracts data transmitted from the reader/writer from the demodulation signal 113 input to the arithmetic processing circuit 105, and stores them to the RAM 503. The data transmitted from the reader/writer are, for example, execution commands or code data. Further, the controller 504 cancels a reset signal of the CPU 501 after storing the data transmitted from the reader/writer in the RAM 503. When the reset signal of the CPU 501 is released, the CPU 501 performs processing in accordance with a program stored in the ROM 502, using the data stored in the RAM 503. Note that the CPU 501 uses the RAM 503 also as a work area in program execution. Processing performed by the CPU 501 is, for example, command analysis or decryption. Further, the CPU 501 stores an arithmetic processing result in the RAM 503. The arithmetic processing result is decoding data, for example. When the CPU 501 finishes performing processing, the CPU 501 transmits a signal indicating termination to the controller 504. Then, the controller 504 reads the arithmetic processing result stored in the RAM 503 and outputs it as the transmitted data 111.

With the structure described above, a semiconductor device which does not mistake data transmitted from the semiconductor device itself to the reader/writer for data transmitted from the reader/writer can be provided. That is, operational reliability of the semiconductor device can be improved, and a high-performance semiconductor device can be provided.

Embodiment 2

Figure 10A:
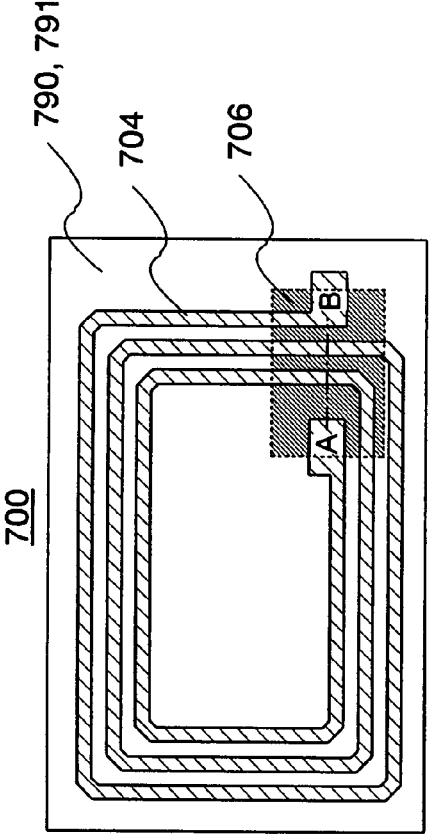
FIG. 10A is a top view and FIG. 10B is a cross-sectional view showing an example of a structure of a semiconductor device of the invention.
Figure 10B:
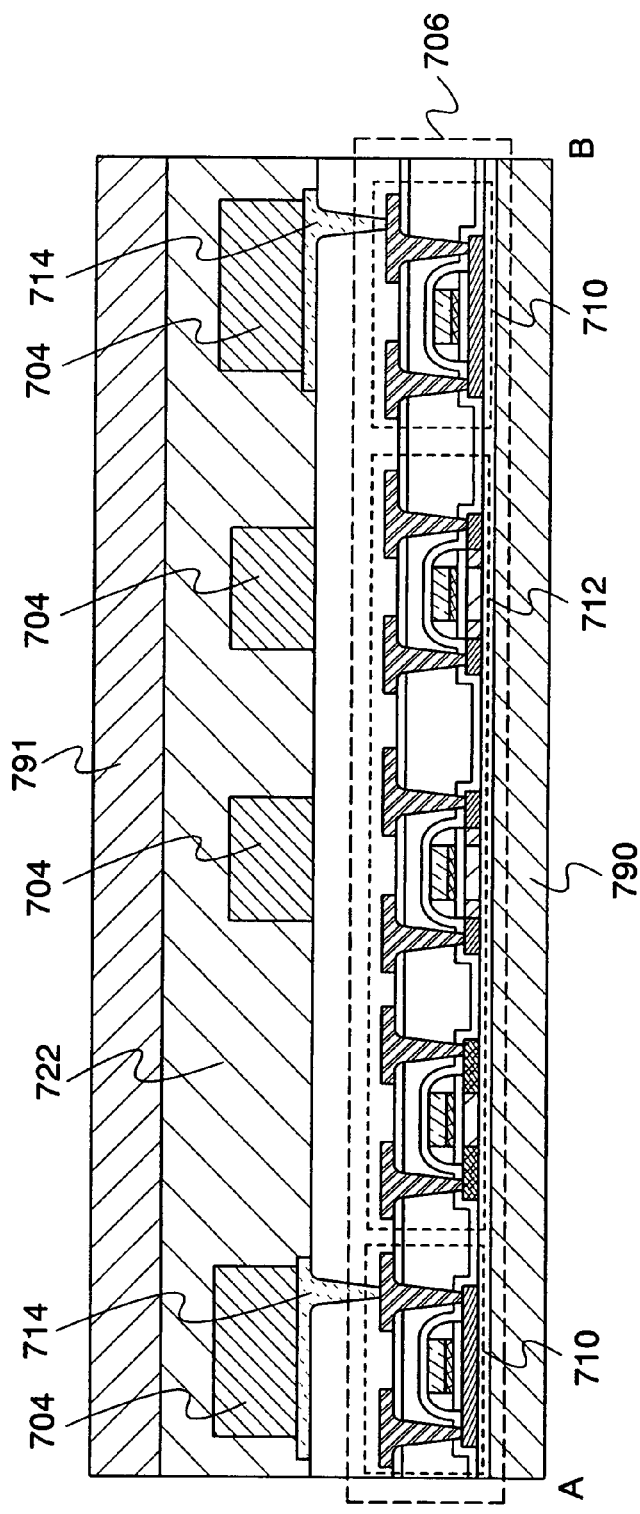

Next, an example of a structure of a semiconductor device of the invention is described with reference to drawings. FIG. 10A is a top view of a semiconductor device 700 of this embodiment. FIG. 10B is a cross-sectional view along a line A-B in FIG. 10A.

As shown in FIG. 10A, in the semiconductor device 700 of this embodiment, an integrated circuit 706 and an antenna 704 are interposed between substrates 790 and 791. The integrated circuit 706 refers to the antenna circuit 102, the transmission circuit 103, the reception circuit 104, and the arithmetic processing circuit 105 in FIG. 1; however, the integrated circuit 706 does not include the antenna forming the antenna circuit 102. Further, as shown in FIG. 10B, the integrated circuit 706 and the antenna 704 are electrically connected by a connection terminal 714.

Note that connection between the connection terminal 714 and the antenna 704 is not particularly limited. For example, the antenna 704 and the connection terminal 714 can be connected using wire bonding or bump bonding. Further, the connection terminal 714 and the antenna 704 can be attached using an ACF (Anisotropic Conductive Film).

In FIG. 10B, a capacitor portion 710 which is a part of the antenna circuit (e.g., the electrical capacitor 405 in FIG. 4) and a transistor portion 712 including other circuits (e.g., a transmission circuit, a reception circuit, and an arithmetic processing circuit) are included as the integrated circuit 706. Note that an example is shown here in which a thin film transistor is used for a transistor forming the other circuits; however, a resistor, a capacitor, a rectifying element, or the like may be added in accordance with a function needed for the other circuits. Further, as a transistor forming the integrated circuit 706, a MOS transistor formed on a Si wafer may be used. Here, the capacitor portion 710 includes a capacitor having a thin film transistor structure, and an impurity element imparting n-type conductivity or an impurity element imparting p-type conductivity is added to an entire surface of a semiconductor layer of the capacitor. The semiconductor layer to which the impurity element is added functions as a lower electrode of the capacitor. It is needless to say that the antenna circuit may include a thin film transistor, a resistor, a rectifying element, and the like in addition to the capacitor.

Figure 16:
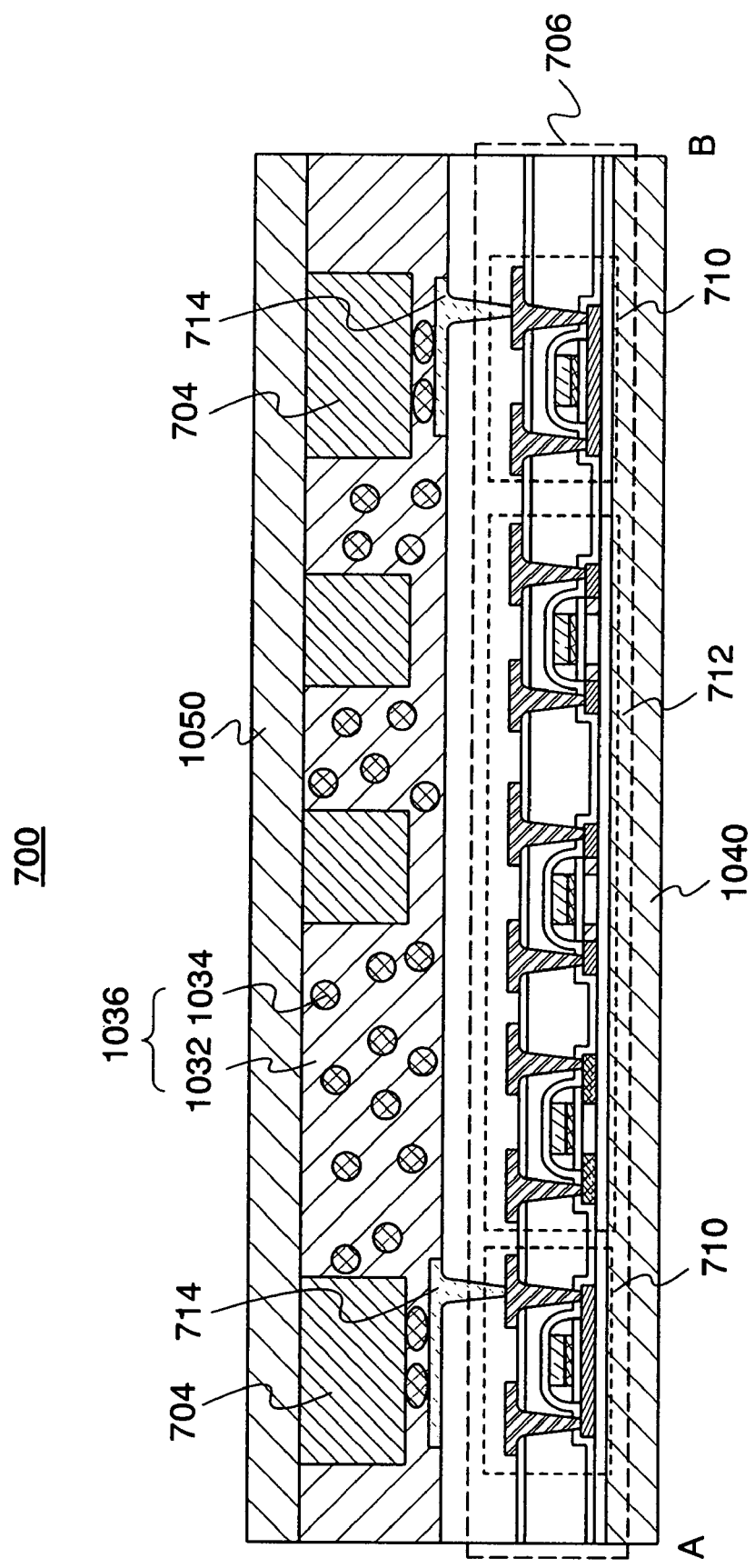
FIG. 16 is a cross-sectional view showing an example of a structure of a semiconductor device of the invention.

In addition, as shown in FIG. 16, the integrated circuit 706 and the antenna 704 may be formed over different substrates and electrically connected using an anisotropic conductive adhesive material 1036 or the like. In the semiconductor device 700 in FIG. 16, the integrated circuit 706 formed over a substrate 1040 and the antenna 704 formed on a substrate 1050 are adhered by the anisotropic conductive adhesive material 1036. The anisotropic conductive adhesive material 1036 includes an organic resin 1032 and a conductive particle 1034. Further, the connection terminal 714 and the antenna 704 are electrically connected by the conductive particle 1034.

Figure 8A:
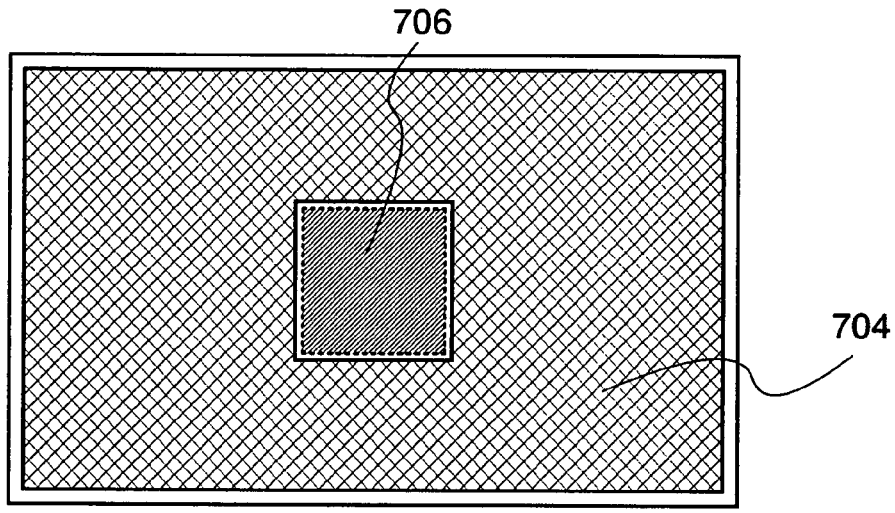
FIGS. 8A to 8D each show a structure example of an antenna applicable to a semiconductor device of the invention.
Figure 8B:
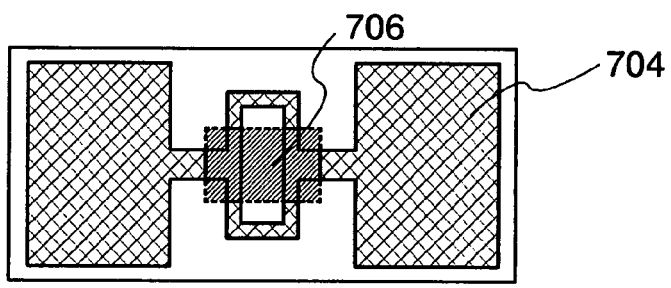
Figure 8C:
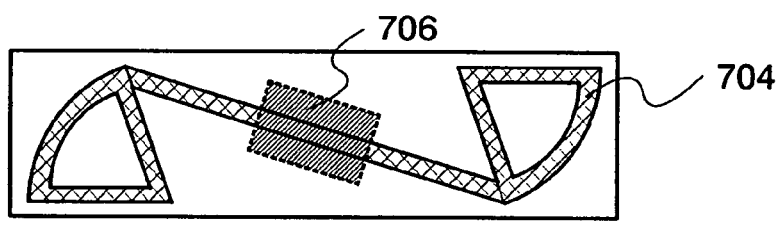
Figure 8D:
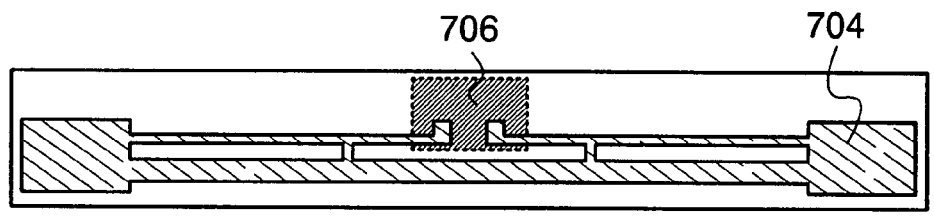

Here, examples of a shape of the antenna which can be used for the semiconductor device of the invention are shown. As the antenna which can be used for the semiconductor device of the invention, the coiled antenna 704 (also referred to as a coil antenna) shown in FIG. 10A can be used, for example. Alternatively, as shown in FIG. 8A, the antenna 704 may be provided all around the integrated circuit 706 over a substrate. As shown in FIG. 8B, a shape of the antenna 704 may be for receiving a high-frequency electromagnetic wave with respect to the integrated circuit 706 over the substrate. As shown in FIG. 8C, the 180 degrees omnidirectional (capable of receiving signals in any directions) antenna 704 may be formed with respect to the integrated circuit 706 over the substrate. Further alternatively, as shown in FIG. 8D, the antenna 704 (also referred to as a dipole antenna) extended to be long in a stick shape may be formed with respect to the integrated circuit 706 over the substrate. Further, a patch antenna or a ceramic antenna may be used. In addition, a shape of a conductive film functioning as an antenna is not limited to a linear shape, and a curved-line shape, a meandering shape, or a combination thereof may be employed in consideration of a wavelength of an electromagnetic wave.

An appropriate length of the antenna varies depending on frequency for receiving a signal. In general, the length is preferably a wavelength divided by an integer.

Frequency of signals transmitted and received between the antenna 704 and the reader/writer varies depending on an established ISO standard or the like. In the embodiment mode, an example conformed to ISO/IEC 15693 is shown, and a frequency of 13.56 MHz±7 kHz is used as the frequency. It is needless to say that the frequency of the signals transmitted and received between the antenna 704 and the reader/writer is not limited thereto, and may be 125 kHz, 915 MHz, 2.45 GHz, or the like when other ISO standards are used, and the like. In addition, any of the following frequency can be employed: a submillimeter wave of 300 Ghz to 3 THz, an extremely high frequency of 30 to 300 Ghz, a super high frequency of 3 to 30 Ghz, an ultra high frequency of 300 MHz to 3 Ghz, a very high frequency of 30 to 300 MHz, a high frequency of 3 to 30 MHz, a medium frequency of 300 KHz to 3 MHz, a low frequency of 30 to 300 KHz, and a very low frequency of 3 to 30 KHz.

As a signal transmission method for the aforementioned semiconductor device which transmits and receives data by wireless communication, an electromagnetic coupling method, an electromagnetic induction method, a microwave method, or the like can be used. The transmission method is selected as appropriate by a practitioner in consideration of application use, and an optimum antenna may be provided in accordance with the transmission method.

Embodiment 3

In this embodiment, an example of a manufacturing method of a semiconductor device of the invention, which is shown in the embodiment mode, is described with reference to FIGS. 11A to 11D, 12A to 12C, 13A to 13C, and 14A and 14B.

Figure 11A:
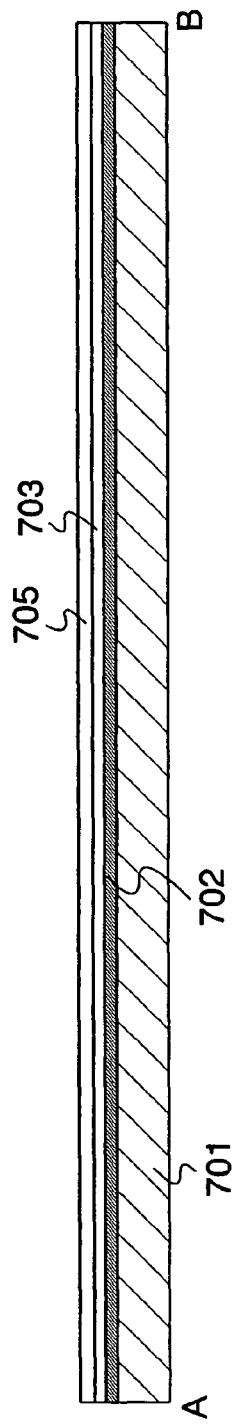
FIGS. 11A to 11D show an example of a manufacturing method of a semiconductor device of the invention.
Figure 11B:
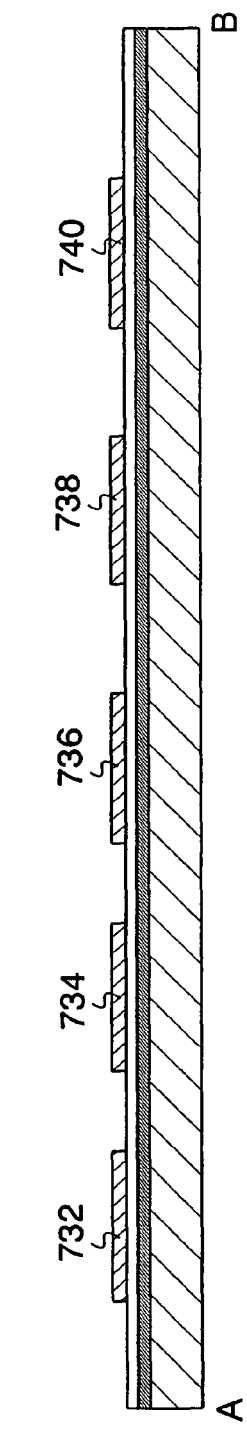

First, a peeling layer 702 is formed on one surface of a substrate 701, and then, an insulating film 703 functioning as a base film and a semiconductor film 705 (e.g., a film containing amorphous silicon) are stacked (see FIG. 11A). Note that the peeling layer 702, the insulating film 703, and the amorphous semiconductor film 705 can be continuously formed.

As the substrate 701, a substrate having an insulating surface can be used, for example, a glass substrate, a quarts substrate, a metal substrate (e.g., a stainless steel substrate), a ceramics substrate, a semiconductor substrate such as a Si substrate, and the like. Alternatively, a plastic substrate such as a substrate formed using polyethylene terephthalate (PET), polyethylene naphthalate (PEN), polyether sulfone (PES), acrylic, or the like can be used. Note that in this step, the peeling layer 702 is formed on an entire surface of the substrate 701; however, the peeling layer may be selectively formed by a photolithography method after the peeling layer is provided on the entire surface of the substrate 701 if required. Further, an insulating film functioning as a blocking layer may be formed between the substrate 701 and the peeling layer 702.

As the peeling layer 702, a metal film, a stacked-layer structure of a metal film and a metal oxide film, or the like can be used. As the metal film, a single-layer structure or a stacked-layer structure of a film formed of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or an alloy material or a compound material containing the above-described element as its main component may be employed. These materials can be formed using a sputtering method, various CVD methods such as a plasma CVD method, or the like. As the stacked-layer structure of a metal film and a metal oxide film, after the aforementioned metal film is formed, plasma treatment in an oxygen atmosphere or an $N_2O$ atmosphere, or heat treatment in an oxygen atmosphere or an $N_2O$ atmosphere is performed so that an oxide or an oxynitride of the metal film can be formed on a surface of the metal film. For example, when a tungsten film is formed as the metal film by a sputtering method, a CVD method, or the like, plasma treatment is performed on the tungsten film so that a metal oxide film of tungsten oxide can be formed on a surface of the tungsten film. In this case, an oxide of tungsten is expressed by $WO_x$, and x is 2 to 3. There are cases of x=2 ($WO_2$), x=2.5 ($W_2O_5$), x=2.75 ($W_4O_{11}$), x=3 ($WO_3$), and the like. When an oxide of tungsten is formed, the value of x described above is not particularly limited, and the oxide to be formed may be determined based on an etching rate or the like. Alternatively, for example, after a metal film (e.g., tungsten) is formed, an insulating film of silicon oxide ($SiO_2$) or the like may be formed over the metal film by a sputtering method, so that an oxide of the metal film can be formed at an interface between the metal film and the insulating film (e.g., tungsten oxide over tungsten). In addition, as plasma treatment, high-density plasma treatment may be performed, for example. Here, high-density plasma treatment refers to plasma treatment under conditions of electron density of $1 \times 10^{11}/cm^{-3}$ or more and electron temperature of 1.5 eV or less by using high frequency. Specifically, it is preferably performed utilizing plasma which is excited by high frequency such as microwaves (typically 2.45 Ghz), and has electron density of $1 \times 10^{11}$ to $1 \times 10^{13}/cm^{-3}$ and electron temperature of 0.5 to 1.5 eV Further, as the peeling layer 702, a metal nitride or a metal oxynitride may also be used as well as the metal oxide film. In this case, plasma treatment or heat treatment may be performed on the metal film in a nitrogen atmosphere or an atmosphere of nitrogen and oxygen.

The insulating film 703 is formed using an insulating material such as silicon oxide, silicon nitride, silicon oxynitride (SiOxNy) (x>y>0), or silicon nitride oxide (SiNxOy) (x>y>0), by a CVD method, a sputtering method, or the like. For example, when the insulating film 703 has a two-layer structure, it is preferable that a silicon nitride oxide film be formed as a first insulating film and a silicon oxynitride film be formed as a second insulating film. Alternatively, a silicon nitride film may be formed as the first insulating film and a silicon oxide film may be formed as the second insulating film. The insulating film 703 functions as a blocking layer which prevents an impurity element from being mixed into an element formed above the peeling layer 702 from the substrate 701 or the peeling layer 702. By forming the insulating film 703 functioning as the blocking layer in this manner, the element formed thereover can be prevented from being adversely affected by alkali metal such as Na and alkali earth metal from the substrate 701 and the impurity element included in the peeling layer 702. Note that when quartz is used for the substrate 701, the insulating film 703 may be omitted.

The amorphous semiconductor film 705 is formed having a thickness of 25 to 200 nm (preferably, 30 to 150 nm) by a sputtering method, an LPCVD method, a plasma CVD method, or the like.

Next, the amorphous semiconductor film 705 is crystallized by being irradiated with a laser beam. The amorphous semiconductor film 705 may be crystallized by a method in which laser beam irradiation is combined with a thermal crystallization method using an RTA or an annealing furnace, or a thermal crystallization method using a metal element for promoting crystallization, or the like.

Next, channel doping is performed, by which an impurity element imparting p-type conductivity or an impurity element imparting n-type conductivity is added at a low concentration to the obtained crystalline semiconductor film entirely or selectively. As the impurity element imparting p-type conductivity, boron (B), aluminum (Al), gallium (Ga), or the like can be used. As the impurity element imparting n-type conductivity, phosphorus (P), arsenic (As), or the like can be used. Here, boron (B) is used as the impurity element and added at a concentration of $1\times10^{16}$ to $5\times10^{17}/cm^3$. Thereafter, the obtained crystalline semiconductor film is etched into a desired shape to form a semiconductor film 732, a semiconductor film 734, a semiconductor film 736, a semiconductor film 738, and a semiconductor film 740 (see FIG. 11B). Note that channel doping may be performed after the crystalline semiconductor film is etched into a desired shape.

Figure 11C:
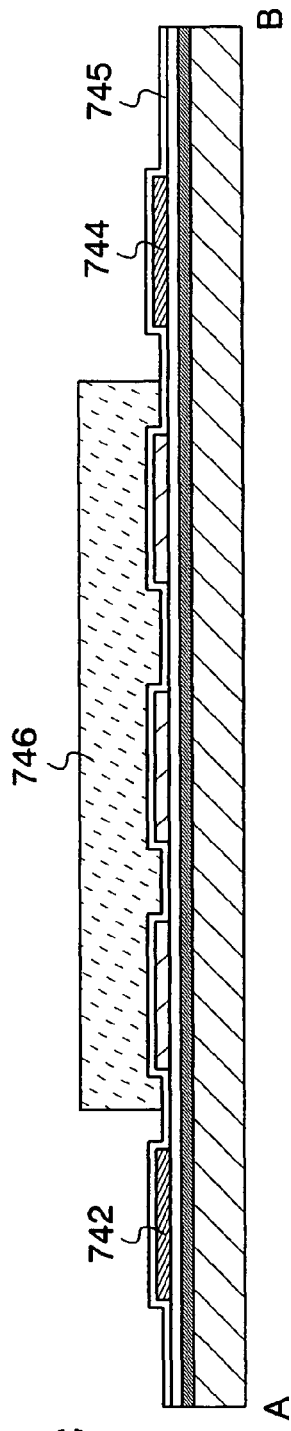

Next, a gate insulating film 745 is formed to cover the semiconductor films 732, 734, 736, 738, and 740 (see FIG. 11C).

The gate insulating film 745 is formed using an insulating material such as silicon oxide, silicon nitride, silicon oxynitride (SiOxNy) (x>y>0), or silicon nitride oxide (SiNxOy) (x>y>0), by a CVD method, a sputtering method, or the like. For example, when the gate insulating film 745 has a two-layer structure, it is preferable that a silicon oxynitride film be formed as a first insulating film and a silicon nitride oxide film be formed as a second insulating film. Alternatively, a silicon oxide film may be formed as the first insulating film and a silicon nitride film may be formed as the second insulating film.

An example of a manufacturing step of the crystalline semiconductor films 732, 734, 736, 738, and 740 is briefly described below. First, an amorphous semiconductor film having a thickness of 50 to 60 nm is formed by a plasma CVD method. Next, a solution containing nickel, which is a metal element for promoting crystallization, is retained on the amorphous semiconductor film, and dehydrogenation treatment (at 500° C., for one hour) and thermal crystallization treatment (at 550° C., for four hours) are performed on the amorphous semiconductor film to form a crystalline semiconductor film. Thereafter, the crystalline semiconductor films 732, 734, 736, 738, and 740 are formed by laser beam irradiation and a photolithography method. Note that without performing the thermal crystallization which uses the metal element for promoting crystallization, the amorphous semiconductor film may be crystallized only by laser beam irradiation.

As a laser oscillator for crystallization, a continuous wave laser (hereinafter also referred to as a CW laser) or a pulsed wave laser (hereinafter also referred to as a pulsed laser) can be used. As a laser which can be used here, one or more of the following can be used: a gas laser such as an Ar laser, a Kr laser, or an excimer laser; a laser of which medium is single crystalline YAG, YVO$_4$, forsterite (Mg$_2$SiO$_4$), YAlO$_3$, or GdVO$_4$, or polycrystalline (ceramic) YAG, Y$_2$O$_3$, YVO$_4$, YAlO$_3$, or GdVO$_4$, added with one or more of Nd, Yb, Cr, Ti, Ho, Er, Tm, and Ta as a dopant; a glass laser; a ruby laser; an alexandrite laser; a Ti:sapphire laser; a copper vapor laser; or a gold vapor laser. Crystals with a large grain size can be obtained by irradiation with a laser beam of a fundamental wave or second to fourth harmonics thereof, which are obtained by such a laser. For example, the second harmonic (532 nm) or the third harmonic (355 nm) of an Nd:YVO$_4$ laser (fundamental wave of 1064 nm) can be used. In this case, a power density of the laser is necessary to be approximately 0.01 to 100 MW/cm$^2$ (preferably, 0.1 to 10 MW/cm$^2$). Irradiation is performed with a scanning rate of approximately 10 to 2000 cm/sec. Note that a laser using, as a medium, single crystalline YAG, YVO$_4$, forsterite (Mg$_2$SiO$_4$), YAlO$_3$, or GdVO$_4$, or polycrystalline (ceramic) YAG, Y$_2$O$_3$, YVO$_4$, YAlO$_3$, or GdVO$_4$ added with one or more of Nd, Yb, Cr, Ti, Ho, Er, Tm, and Ta as a dopant; an Ar ion laser; or a Ti:sapphire laser can be continuously oscillated. Further, pulse oscillation thereof can be performed at a repetition rate of 10 MHz or more by performing Q-switch operation, mode locking, or the like. When a laser beam is oscillated at a repetition rate of 10 MHz or more, a semiconductor film is irradiated with the next pulsed laser beam while the semiconductor film is melted by the laser beam and solidified. Accordingly, unlike a case of using a pulsed laser with a low repetition rate, a solid-liquid interface can be continuously moved in the semiconductor film; thus, crystal grains which continuously grow in a scanning direction can be obtained.

The gate insulating film 745 may be formed so that the aforementioned high-density plasma treatment is performed on the semiconductor films 732, 734, 736, 738, and 740 to oxidize or nitride surfaces thereof. For example, plasma treatment is employed, in which a mixed gas of an inert gas such as He, Ar, Kr, or Xe, and oxygen, nitrogen oxide, ammonia, nitrogen, hydrogen, or the like is introduced. When excitation of the plasma in this case is performed by introduction of a microwave, high-density plasma with a low electron temperature can be generated. By an oxygen radical (an OH radical is included in some cases) or a nitrogen radical (an NH radical is included in some cases) generated by the high-density plasma, the surface of the semiconductor film can be oxidized or nitrided.

By treatment using such high-density plasma, an insulating film having a thickness of 1 to 20 nm, typically 5 to 10 nm, is formed on the semiconductor film. Since the reaction of this case is a solid-phase reaction, interface state density between the insulating film and the semiconductor film can be extremely low. Since such high-density plasma treatment oxidizes (or nitrides) a semiconductor film (of crystalline silicon or polycrystalline silicon) directly, variation of thickness of an insulating film to be formed can be extremely small, ideally. In addition, oxidation is not strengthened even in a crystal grain boundary of crystalline silicon, which makes a very preferable condition. That is, by a solid-phase oxidation of the surface of the semiconductor film by the high-density plasma treatment shown here, the insulating film with good uniformity and low interface state density can be formed without causing oxidation reaction abnormally in a crystal grain boundary.

As the gate insulating film, only an insulating film formed by high-density plasma treatment may be used, or an insulating film of silicon oxide, silicon oxynitride, silicon nitride, or the like may be formed thereover by a CVD method utilizing plasma or thermal reaction to be stacked. In any case, a transistor which includes an insulating film formed by high-density plasma as a part of or the whole gate insulating film can reduce variation of characteristics.

In addition, the semiconductor films 732, 734, 736, 738, and 740 which are obtained in such a manner that the semiconductor film is irradiated with a laser beam obtained by a continuous wave laser or a laser oscillated at a repetition rate of 10 MHz or more and is scanned in one direction for crystallization, have characteristics that the crystal grows in the scanning direction of the laser beam. When a transistor is provided so that the scanning direction is aligned with the channel length direction (a direction in which carriers flow when a channel forming region is formed) and the gate insulating film formed utilizing the aforementioned high-density plasma treatment is used, a thin film transistor (TlFT) with less characteristic variation and high electron field-effect mobility can be obtained.

Next, an impurity element imparting p-type conductivity or an impurity element imparting n-type conductivity is added to the semiconductor films 732 and 740 to form a semiconductor film 742 and a semiconductor film 744 (see FIG. 11C). The semiconductor films 742 and 744 function as lower electrodes of a capacitor to be completed later. As the impurity element imparting p-type conductivity, boron (B), aluminum (Al), gallium (Ga), or the like can be used. As the impurity element imparting n-type conductivity, phosphorus (P), arsenic (As), or the like can be used. Here, phosphorus (P) is used as the impurity element and added at a concentration of $1\times10^{17}$ to $1\times10^{20}$/cm$^3$. At this time, the semiconductor films 734, 736, and 738 are covered with a mask 746 so that the impurity element is not added. A resist mask can be used for the mask 746.

Next, a first conductive film and a second conductive film are stacked over the gate insulating film 745. Here, the first conductive film is formed having a thickness of 20 to 100 nm by a CVD method, a sputtering method, or the like; and the second conductive film is formed having a thickness of 100 to 400 nm. The first conductive film and the second conductive film are formed using an element selected from tantalum (Ta), tungsten (W), titanium (Ti), molybdenum (Mo), aluminum (Al), copper (Cu), chromium (Cr), niobium (Nb), and the like, or an alloy material or a compound material containing the above-described element as its main component. Alternatively, they may be formed using a semiconductor material typified by polycrystalline silicon doped with an impurity element such as phosphorus. As an example of a combination of the first conductive film and the second conductive film, a tantalum nitride film and a tungsten film, a tungsten nitride film and a tungsten film, a molybdenum nitride film and a molybdenum film, and the like can be given. Since tungsten and tantalum nitride have high heat resistance, heat treatment for thermal activation can be performed after the first conductive film and the second conductive film are formed. In addition, in a case of a three-layer structure instead of a two-layer structure, a stacked-layer structure of a molybdenum film, an aluminum film, and a molybdenum film is preferably adopted. Here, a tantalum nitride film is formed as the first conductive film and a tungsten film is formed as the second conductive film.

Figure 11D:
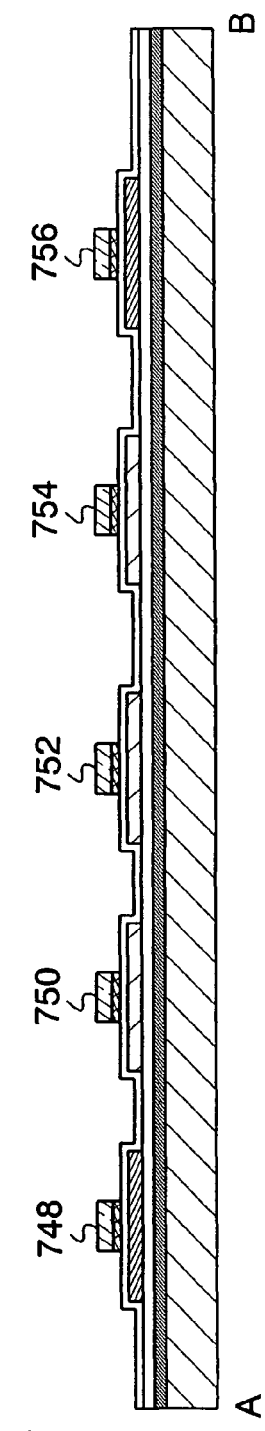
Figure 12A:
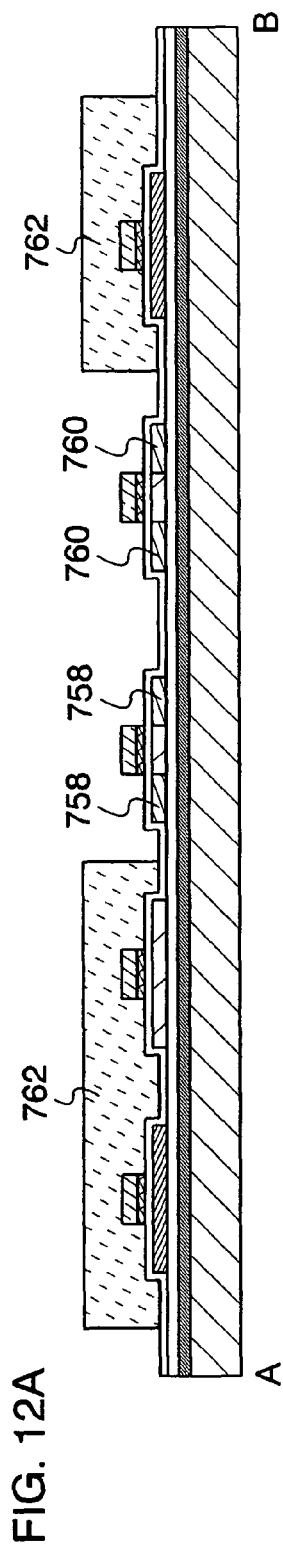
FIGS. 12A to 12C show an example of a manufacturing method of a semiconductor device of the invention.
Figure 12B:
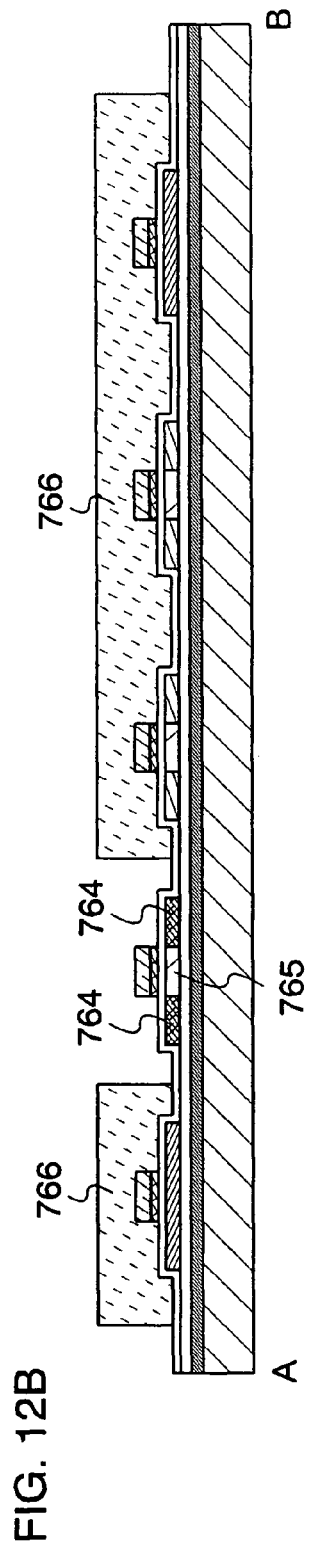
Figure 12C:
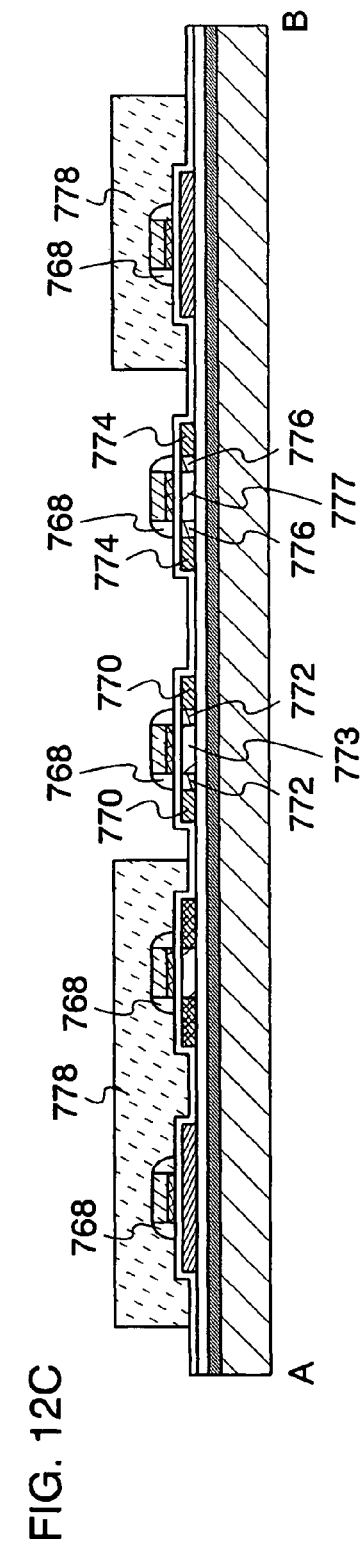
Figure 14A:
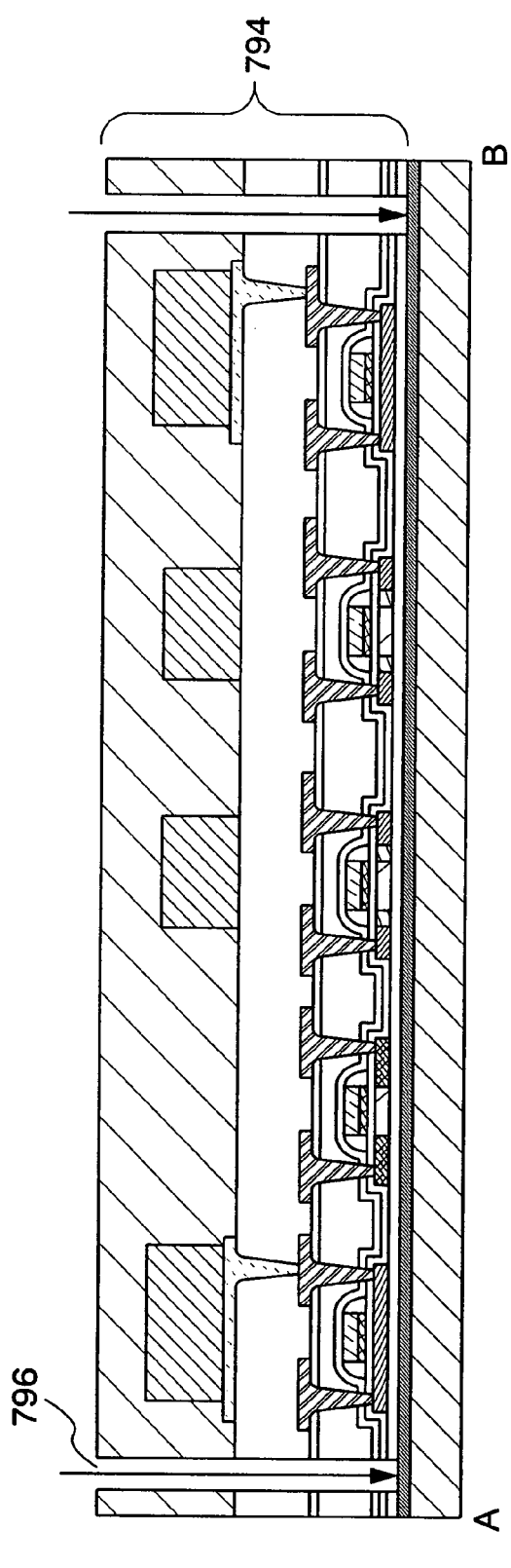
FIGS. 14A and 14B show an example of a manufacturing method of a semiconductor device of the invention.
Figure 14B:
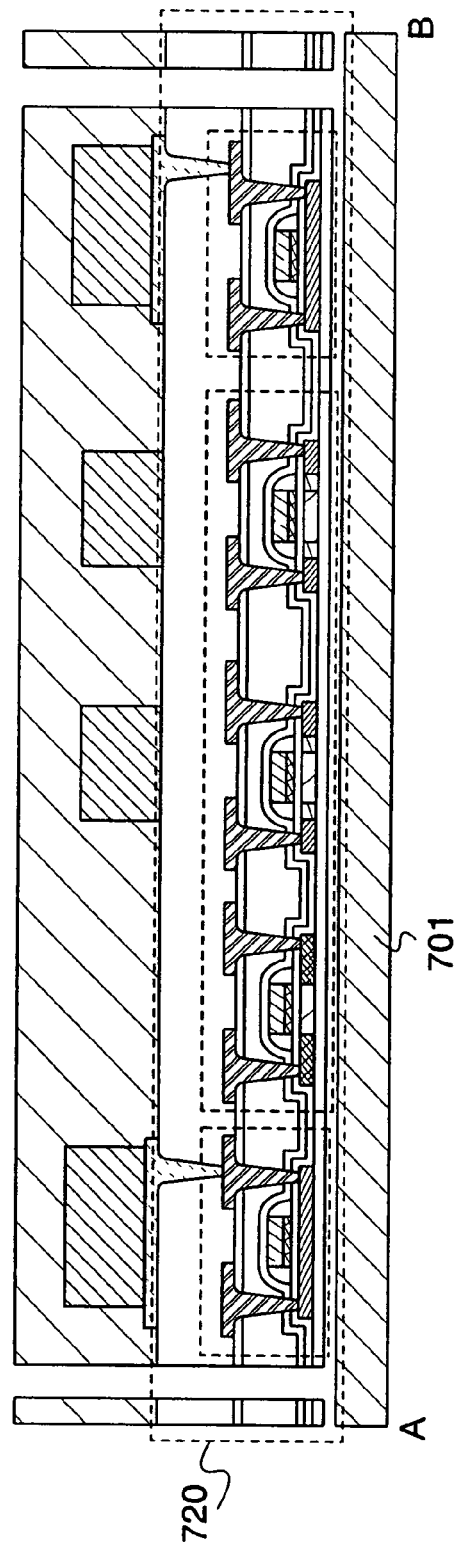

Next, a gate electrode 748, a gate electrode 750, a gate electrode 752, a gate electrode 754, and a gate electrode 756 are formed by etching the first and second conductive films to be selectively removed so that a part of the stacked-layer structure including the first and second conductive films (see FIG. 11D). Note that the gate electrodes 748 and 756 function as upper electrodes of the capacitor to be completed later.

Next, with use of the gate electrodes 752 and 754 as masks, an impurity element imparting n-type conductivity is added to the semiconductor films 736 and 738 at a low concentration by an ion doping method or an ion implantation method to form an impurity region 758 and an impurity region 760. As the impurity element imparting n-type conductivity, phosphorus (P), arsenic (As), or the like can be used. Here, phosphorus (P) is used as the impurity element imparting n-type conductivity and added to the semiconductor films 736 and 738 at a concentration of $5\times10^{17}$ to $1\times10^{19}$/cm$^3$. At this time, the semiconductor films 742, 734, and 744 are covered with masks 762 so that the impurity element is not added. A resist mask can be used for the mask 762 (see FIG. 12A).

Next, with use of the gate electrode 750 as a mask, an impurity element imparting p-type conductivity is added to the semiconductor film 734 at a high concentration to form impurity regions 764 each functioning as a source region or a drain region and a channel forming region 765. As the p-type impurity element, boron (B), aluminum (Al), gallium (Ga), or the like can be used. Here, boron (B) is used for the impurity element imparting p-type conductivity and added to the semiconductor film 734 at a concentration of $1\times10^{19}$ to $1\times10^{21}$/cm$^3$. At this time, the semiconductor films 742, 736, 738, and 744 are covered with masks 766 so that the impurity element is not added. A resist mask can be used for the mask 766 (see FIG. 12B).

Next, an insulating film is formed to cover the gate insulating film 745 and the gate electrodes 748, 750, 752, 754, and 756. The insulating film is formed to have a single-layer structure or a stacked-layer structure using a film including an inorganic material such as silicon, oxide of silicon, or nitride of silicon, or a film including an organic material such as an organic resin by a plasma CVD method, a sputtering method, or the like. Next, the insulating film is selectively etched by anisotropic etching mainly in a perpendicular direction, so that insulating films 768 (also referred to as sidewalls) which are in contact with side surfaces of the gate electrodes 748, 750, 752, 754, and 756 are formed. The insulating films 768 are used as masks for doping when an LDD (Lightly Doped Drain) region is formed.

Next, with use of the gate electrodes 752 and 754 and the insulating films 768 as masks, an impurity element imparting n-type conductivity is added to the semiconductor films 736 and 738 at a high concentration. In the semiconductor film 736, impurity regions 770 each functioning as a source region or a drain region, low concentration impurity regions 772 each forming an LDD region, and a channel forming region 773 are formed. In the semiconductor film 738, impurity regions 774 each functioning as a source region or a drain region, low concentration impurity regions 776 each forming an LDD region, and a channel forming region 777 are formed. Here, phosphorus (P) is used for the impurity element imparting n-type conductivity and added to the semiconductor films 736 and 738 at a concentration of $1\times10^{20}$ to $5\times10^{21}$/cm$^3$. At this time, the semiconductor films 742, 734, and 744 are covered with masks 778 so that the impurity element is not added. A resist mask can be used for the mask 788 (see FIG. 12C).

Through the above-described steps, a capacitor 1310, a p-channel thin film transistor 1320, an n-channel thin film transistor 1330, an n-channel thin film transistor 1340, and a capacitor 1350 are formed (see FIG. 13A).

In the p-channel thin film transistor 1320, the channel forming region 765 is formed in a region of the semiconductor film 734, which overlaps with the gate electrode 750; and the impurity regions 764 forming the source region and the drain region are formed in regions of the semiconductor film 734, which do not overlap with the gate electrode 750. Note that the p-channel thin film transistor 1320 may be provided with an LDD region.

In the n-channel thin film transistor 1330, the channel forming region 773 is formed in a region of the semiconductor film 736, which overlaps with the gate electrode 752; the impurity regions 770 forming the source region and the drain region are formed in a region of the semiconductor film 736, which does not overlap with the gate electrode 752 and the insulating film 768; and the low concentration impurity regions 772 are formed in portions of the semiconductor film 736, which overlap with the insulating film 768 and are between the channel forming region 773 and each impurity region 770. Similarly, in the n-channel thin film transistor 1340, the channel forming region 777, the low concentration impurity regions 776, and the impurity regions 774 are formed.

Next, an insulating film 780 is formed to have a single-layer structure or a stacked-layer structure to cover the gate insulating film 745, the insulating film 768, the gate electrodes 748, 750, 752, 754, and 756, and the like. The insulating film is formed to have a single-layer structure or a stacked-layer structure using an inorganic material such as oxide of silicon or nitride of silicon; an organic material such as polyimide, polyamide, benzocyclobutene, acrylic, or epoxy; a siloxane material; or the like, by a CVD method, a sputtering method, an SOG method, a droplet discharging method, a screen printing method, or the like.

Next, openings are formed in the insulating film 780, and a conductive film 782, a conductive film 784, a conductive film 786, a conductive film 788, and a conductive film 792 are formed in the openings and over the insulating film 780. The conductive film 782 is electrically connected to the semiconductor film 742 in the capacitor 1310. Similarly, the conductive film 792 is electrically connected to the semiconductor film 744 in the capacitor 1350. The conductive films 784, 786, and 788 are electrically connected to the impurity regions 764, 770, and 774 formed in the semiconductor films 734, 736, and 738, respectively. The conductive films 784, 786, and 788 function as source electrodes or drain electrodes of the thin film transistors 1320, 1330, and 1340. Note that a layer including the capacitors 1310 and 1350, the thin film transistors 1320, 1330, and 1340, and the like is referred to as an element formation layer 720 (see FIG. 13B). The element formation layer 720 corresponds to the integrated circuit in FIG. 10.

Before the insulating film 780 is formed or after one or a plurality of layers of the insulating film 780 are formed in a case where the insulating film 780 has a stacked-layer structure, heat treatment for recovering the crystallinity of the semiconductor film, for activating the impurity element added to the semiconductor film, or for hydrogenating the semiconductor film is preferably performed. For the heat treatment, thermal annealing, a laser annealing method, an RTA method, or the like is preferably employed.

The conductive films 782, 784, 786, 788, and 792 are formed to have a single-layer structure or a stacked-layer structure using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing the above-described element as its main component, by a CVD method, a sputtering method, or the like. An alloy material containing aluminum as its main component corresponds to, for example, a material which contains aluminum as its main component and also contains nickel; or an alloy material which contains aluminum as its main component and also contains nickel and one or both of carbon and silicon. The conductive films 782, 784, 786, 788, and 792 preferably employ, for example, a stacked-layer structure of a barrier film, an aluminum-silicon (Al—Si) film, and a barrier film; or a stacked-layer structure of a barrier film, an aluminum-silicon (Al—Si) film, a titanium nitride film, and a barrier film. Note that a barrier film corresponds to a thin film formed of titanium, nitride of titanium, molybdenum, or nitride of molybdenum. Since aluminum and aluminum silicon have low resistance and are inexpensive, they are optimum materials for forming the conductive films 782, 784, 786, 788, and 792. In addition, when upper and lower barrier layers are provided, generation of hillocks of aluminum or aluminum silicon can be prevented. Further, when a barrier film is formed of titanium which is a highly-reducible element, even if a thin natural oxide film is formed on the crystalline semiconductor film, the natural oxide film is reduced so that preferable contact with the crystalline semiconductor film can be obtained.

Next, an insulating film 709 is formed to cover the conductive films 782, 784, 786, 788, and 792, and the connection terminal 714 is formed over the insulating film 709. The connection terminal 714 electrically connects the element formation layer 720 and an antenna to be formed later. Specifically, the connection terminals 714 electrically connect the conductive films 782 and 792 which are electrically connected to the capacitors 1310 and 1350 and the antennas to be formed later. The connection terminal 714 can be formed using any material of the aforementioned conductive films 782, 784, 786, 788, and 792.

The insulating film 709 can have a single-layer structure or a stacked-layer structure using an insulating film containing oxygen or nitrogen, such as silicon oxide (SiOx), silicon nitride (SiNx), silicon oxynitride (SiOxNy) (x>y), or silicon nitride oxide (SiNxOy) (x>y); a film containing carbon such as DLC (Diamond Like Carbon); an organic material such as epoxy, polyimide, polyamide, polyvinyl phenol, benzocyclobutene, or acrylic; or a siloxane material such as a siloxane resin, by a CVD method, a sputtering method, or the like. Note that a siloxane material corresponds to a material having Si—O—Si bonds. Siloxane has a skeleton structure formed of a bond of silicon (Si) and oxygen (O). As a substituent, an organic group (e.g., an alkyl group or aromatic hydrocarbon) containing at least hydrogen is used. Alternatively, a fluoro group, or an organic group containing at least hydrogen and a fluoro group may be used as a substituent.

Next, the antennas 704 are formed over the connection terminals 714 and the insulating film 709. The antennas 704 are formed to be electrically connected to the element formation layer 720 through the connection terminals 714. The antenna 704 is formed using a conductive material by a CVD method, a sputtering method, a printing method such as screen printing or gravure printing, a droplet discharging method, a dispenser method, a plating method, or the like. The conductive material is formed to have a single-layer structure or a stacked-layer structure using an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing the above-described element as its main component.

For example, when the antenna 704 is formed by a screen printing method, the antenna can be formed by selectively printing conductive paste in which conductive particles each having a grain size of several nm to several tens of μm are dissolved or dispersed in an organic resin. As the conductive particle, one or more metal particles of silver (Ag), gold (Au), copper (Cu), nickel (Ni), platinum (Pt), palladium (Pd), tantalum (Ta), molybdenum (Mo), titanium (Ti), and the like; a fine particle of silver halide; or a dispersive nanoparticle can be used. As the organic resin contained in the conductive paste, one or a plurality of organic resins functioning as a binder, a solvent, a dispersant, or a coating for the metal particle can be used. Typically, an organic resin such as an epoxy resin or a silicone resin can be used. When a conductive film is formed, baking is preferably performed after the conductive paste is applied. For example, when fine particles (e.g., of which grain size is in the range of 1 to 100 nm, inclusive) containing silver as its main component is used as a material of the conductive paste, a conductive film can be obtained by hardening the conductive paste by baking at a temperature of 150 to 300° C. Alternatively, fine particles containing solder or lead-free solder as its main component may be used; in this case, it is preferable to use a fine particle having a grain size of 20 μm or less. Solder and lead-free solder have an advantage such as low cost. Note that the antenna 704 shown in FIG. 13C is coiled when seen from the top surface.

Next, an insulating film 722 is formed to cover the antenna 704 (see FIG. 13C). The insulating film 722 can have a single-layer structure or a stacked-layer structure using an insulating film containing oxygen or nitrogen, such as silicon oxide (SiOx), silicon nitride (SiNx), silicon oxynitride (SiOxNy) (x>y), or silicon nitride oxide (SiNxOy) (x>y); a film containing carbon such as DLC (Diamond Like Carbon); an organic material such as epoxy, polyimide, polyamide, polyvinyl phenol, benzocyclobutene, or acrylic; or a siloxane material such as a siloxane resin, by a CVD method, a sputtering method, or the like.

Next, a layer (hereinafter referred to as a layer 794) including the insulating film 703 to the insulating film 722 formed over the peeling layer 702 is peeled from the substrate 701. For example, after an opening 796 is formed in a region except for the capacitors and the thin film transistors by laser beam (e.g., UV light) irradiation (see FIG. 14A), the layer 794 is peeled from the substrate 701 by using physical force (see FIG. 14B). Further, before the layer 794 is peeled from the substrate 701, an etchant may be introduced into the opening 796 so that the peeling layer 702 is selectively removed. As the etchant, gas or liquid containing halogen fluoride or an interhalogen compound is used; for example, chlorine trifluoride (ClF$_3$) is used as a gas containing halogen fluoride. Thus, the layer 794 is peeled from the substrate 701. Note that the peeling layer 702 may be partially left instead of being removed entirely; thus, consumption of the etchant can be suppressed and processing time to remove the peeling layer can be shortened. Further, the layer 794 can be retained over the substrate 701 even after the peeling layer 702 is removed. In addition, cost can be reduced by reusing the substrate 701 from which the layer 794 has been peeled off.

Figure 15:
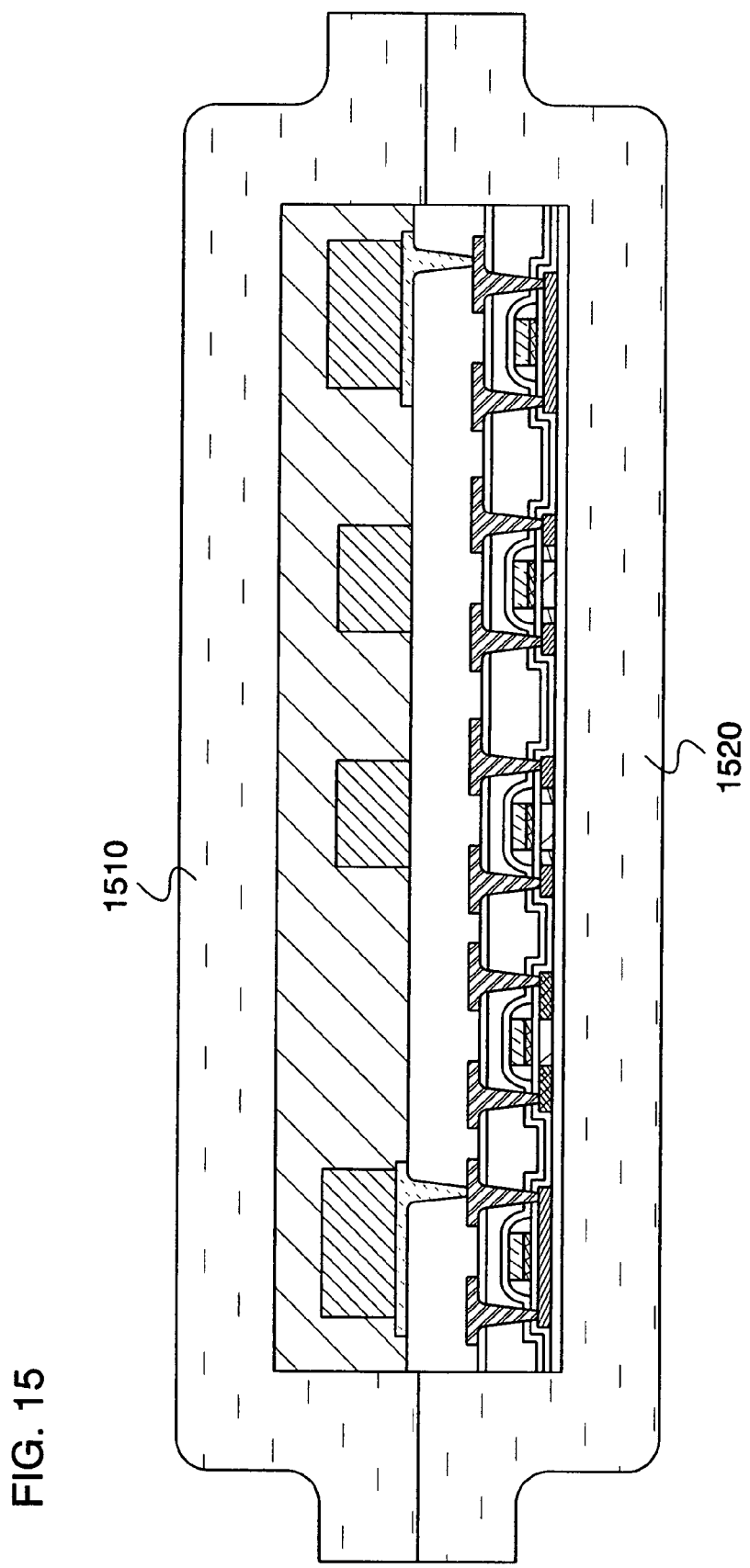
FIG. 15 shows an example of a manufacturing method of a semiconductor device of the invention.

Next, one surface (a surface where the insulating film 722 is exposed) of the layer 794 is attached to a first base 1510, and the layer 794 is completely peeled from the substrate 701. Then, the other surface (a surface where the insulating film 703 is exposed) of the layer 794 is attached to a second base 1520, and the layer 794 is sealed by the first base 1510 and the second base 1520 by performing one or both of heat treatment and pressure treatment (see FIG. 15). The first base 1510 and the second base 1520 correspond to a film having a thermoplastic property (e.g., polyolefin, polyolefin containing fluorine, or polyester), paper formed of a fibrous material, and a stacked-layer film of a base film (e.g., polyester, polyamide, an inorganic deposition film, or paper) and an adhesive synthetic resin film (e.g., acrylic synthetic resin or epoxy synthetic resin).

As the first base 1510 and the second base 1520, a film on which antistatic treatment for preventing static electricity or the like is performed (hereinafter referred to as an antistatic film) can also be used. As the antistatic film, a film with an antistatic material dispersed in a resin, a film with an antistatic material attached thereon, and the like can be given as an example. The film provided with the antistatic material may be a film provided with the antistatic material on one of its surfaces, or a film provided with the antistatic material on each of its surfaces. Further, as the film provided with the antistatic material on one of its surfaces, the film may be attached to the layer so that the antistatic material is placed on either the inner side of the film or the outer side of the film. The antistatic material may be provided over the entire or a part of the surface of the film. As the antistatic material here, a metal, indium tin oxide (ITO), or surfactant such as an amphoteric surfactant, a cationic surfactant, or a nonionic surfactant can be used. Alternatively, as the antistatic material, a resin material containing crosslinkable copolymer having a carboxyl group and a quaternary ammonium base in its side chain, or the like can be used. By attaching, mixing, or applying such a material to a film, an antistatic film can be formed. By sealing with the antistatic film, adverse effects on a semiconductor element due to static electricity or the like from the outside can be suppressed when the semiconductor device is treated as a commercial product.

Through the above-described steps, a semiconductor device of the invention can be formed. Further, through the above-described steps, the semiconductor device with flexibility and improved operational reliability can be formed.

Embodiment 4

In this embodiment, an example of a manufacturing method of the semiconductor device, which is different from the aforementioned embodiment, is described with reference to FIGS. 17A to 17C, 18A to 18C, and 19. Specifically, an example where a MOS transistor is formed on a semiconductor substrate is described.

In this embodiment, a transistor portion forming an integrated circuit is shown as a representative example. Here, a manufacturing method of a p-channel transistor and an n-channel transistor is described.

Figure 17A:
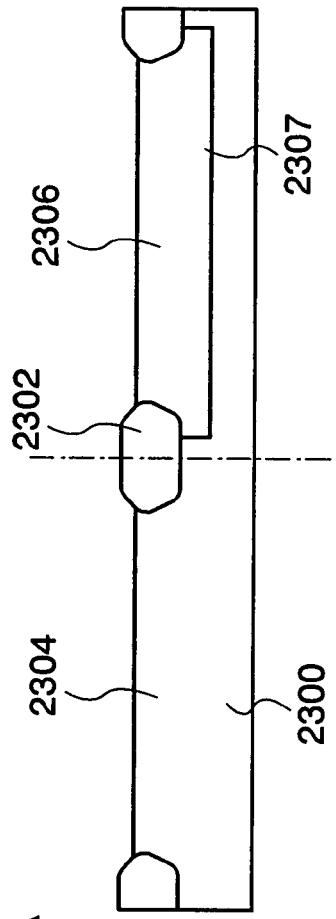
FIGS. 17A to 17C show an example of a manufacturing method of a semiconductor device of the invention.

First, element isolation regions 2304 and 2306 (hereinafter also referred to as regions 2304 and 2306) are formed in a semiconductor substrate 2300 (see FIG. 17A). The regions 2304 and 2306 provided in the semiconductor substrate 2300 are isolated by an insulating film 2302 (also referred to as a field oxide film). Here, an example is shown in which a single crystalline Si substrate having n-type conductivity is used as the semiconductor substrate 2300 and a p-well 2307 is provided in the region 2306 of the semiconductor substrate 2300.

Any semiconductor substrate can be used as the semiconductor substrate 2300. For example, a single crystalline. Si substrate having n-type conductivity or p-type conductivity, a compound semiconductor substrate (e.g., a GaAs substrate, an InP substrate, a GaN substrate, a SiC substrate, a sapphire substrate, or a ZnSe substrate), an SOI (Silicon On Insulator) substrate formed using a bonding method or a SIMOX (Separation by IMplanted OXygen) method, or the like can be used.

The element isolation regions 2304 and 2306 can be formed using a LOCOS (LOCal Oxidation of Silicon) method, a trench isolation method, or the like, as appropriate.

The p-well 2307 in the region 2306 of the semiconductor substrate 2300 can be formed by selectively introducing a p-type impurity element into the semiconductor substrate 2300. As the p-type impurity element, boron (B), aluminum (Al), gallium (Ga), or the like can be used.

Note that in this embodiment, an impurity element is not introduced into the region 2304 since the semiconductor substrate having n-type conductivity is used as the semiconductor substrate 2300; however, an n-well may be formed in the region 2304 by introducing an n-type impurity element. As the n-type impurity element, phosphorus (P), arsenic (As), or the like can be used. On the other hand, when a semiconductor substrate having p-type conductivity is used, a structure may be employed where an n-well is formed by introducing the n-type impurity element into the region 2305 and an impurity element is not introduced into the region 2306.

Figure 17B:
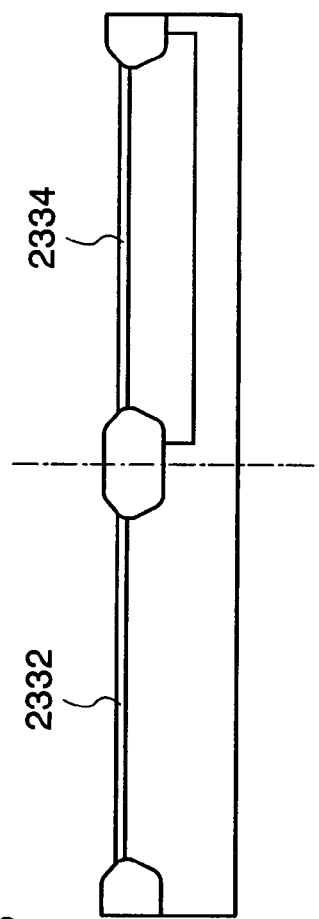

Next, insulating films 2332 and 2334 are formed to cover the regions 2304 and 2306, respectively (see FIG. 17B).

The insulating films 2332 and 2334 can be formed of, for example, silicon oxide films by oxidizing surfaces of the regions 2304 and 2306 provided in the semiconductor substrate 2300 by heat treatment. Alternatively, the insulating films 2332 and 2334 may have a stacked-layer structure of a silicon oxide film and a film containing oxygen and nitrogen (hereinafter also referred to as a silicon oxynitride film) by forming a silicon oxide film by a thermal oxidation method and then nitriding a surface of the silicon oxide film by nitridation treatment.

Alternatively, the insulating films 2332 and 2334 may by formed using the aforementioned plasma treatment. For example, oxidation treatment or nitridation treatment is performed on the surfaces of the regions 2304 and 2306 provided in the semiconductor substrate 2300 by high-density plasma treatment, whereby silicon oxide (SiOx) films or silicon nitride (SiNx) films can be formed as the insulating films 2332 and 2334. Further, after oxidation treatment is performed on the surfaces of the regions 2304 and 2306 by high-density plasma treatment, nitride treatment may be performed by high-density plasma treatment again. In this case, silicon oxide films are formed in contact with the surfaces of the regions 2304 and 2306 and silicon oxynitride films are formed on the silicon oxide films, whereby each of the insulating films 2332 and 2334 has a stacked-layer structure of the silicon oxide film and the silicon oxynitride film. Further, after silicon oxide films are formed on the surfaces of the regions 2304 and 2306 by a thermal oxidation method, oxidation treatment or nitridation treatment may be performed by high-density plasma treatment.

The insulating films 2332 and 2334 formed in the regions 2304 and 2306 of the semiconductor substrate 2300 function as gate insulating films in transistors to be completed later.

Figure 17C:
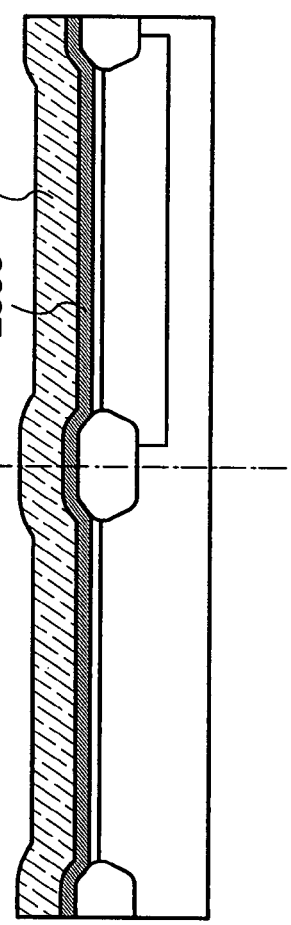

Next, a conductive film is formed to cover the insulating films 2332 and 2334 formed above the regions 2304 and 2306 (see FIG. 17C). Here, an example is shown in which a conductive film 2336 and a conductive film 2338 are sequentially stacked to form the conductive film. It is needless to say that the conductive film may be a single-layer structure or a stacked-layer structure of three or more layers.

The conductive films 2336 and 2338 can be formed of an element selected from tantalum (Ta), tungsten (W), titanium (Ti), molybdenum (Mo), aluminum (Al), copper (Cu), chromium (Cr), niobium (Nb), and the like, or an alloy material or a compound material containing the above-described element as its main component. Alternatively, the conductive films 2336 and 2338 can be formed of a metal nitride film obtained by nitriding the above-described element or a semiconductor material typified by polycrystalline silicon doped with an impurity element such as phosphorus.

Here, the conductive film 2336 is formed using tantalum nitride and the conductive film 2338 is formed thereover using tungsten so that a stacked-layer structure is provided. Alternatively, as the conductive film 2336, a single layer or a stacked layer of tungsten nitride, molybdenum nitride, and/or titanium nitride can be used. As the conductive film 2338, a single layer or a stacked layer of tantalum, molybdenum, and/or titanium can be used.

Figure 18A:
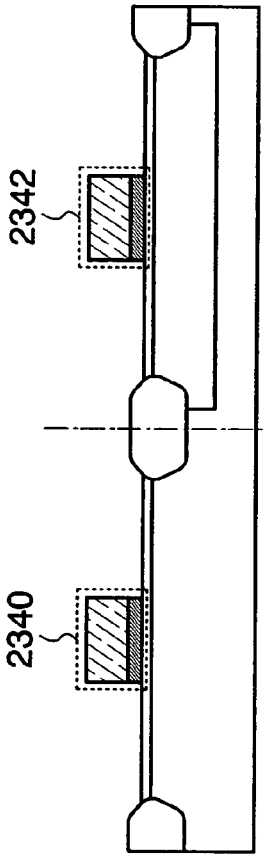
FIGS. 18A to 18C show an example of a manufacturing method of a semiconductor device of the invention.

Next, the stacked conductive films 2336 and 2338 are selectively removed by etching, whereby the conductive films 2336 and 2338 partially remain above the regions 2304 and 2306 to form gate electrodes 2340 and 2342, respectively (see FIG. 18A).

Figure 18B:
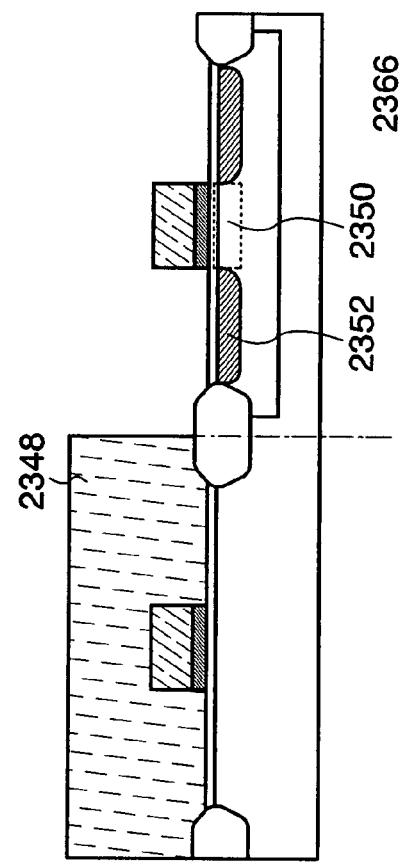

Next, a resist mask 2348 is selectively formed to cover the region 2304, and an impurity element is introduced into the region 2306 by using the resist mask 2348 and the gate electrode 2342 as masks, so that impurity regions are formed (see FIG. 18B). As the impurity element, an impurity element imparting n-type conductivity or an impurity element imparting p-type conductivity is used. As the n-type impurity element, phosphorus (P), arsenic (As), or the like can be used. As the p-type impurity element, boron (B), aluminum (Al), gallium (Ga), or the like can be used. Here, phosphorus (P) is used as the impurity element.

In FIG. 18B, by introducing the impurity element, impurity regions 2352 forming a source region and a drain region and a channel forming region 2350 are formed in the region 2306.

Figure 18C:
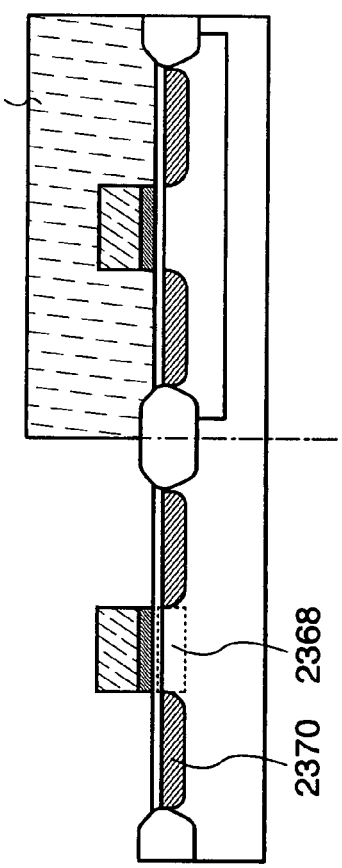

Next, a resist mask 2366 is selectively formed to cover the region 2306, and an impurity element is introduced into the region 2304 by using the resist mask 2366 and the gate electrode 2340 as masks, so that impurity regions are formed (see FIG. 18C). As the impurity element, an impurity element imparting n-type conductivity or an impurity element imparting p-type conductivity is used. As the n-type impurity element, phosphorus (P), arsenic (As), or the like can be used. As the p-type impurity element, boron (B), aluminum (Al), gallium (Ga), or the like can be used. Here, an impurity element (e.g., boron (B)) which has different conductivity from the impurity element introduced into the region 2306 in FIG. 18B is introduced. As a result, impurity regions 2370 forming a source region and a drain region and a channel forming region 2368 are formed in the region 2304.

Figure 19:
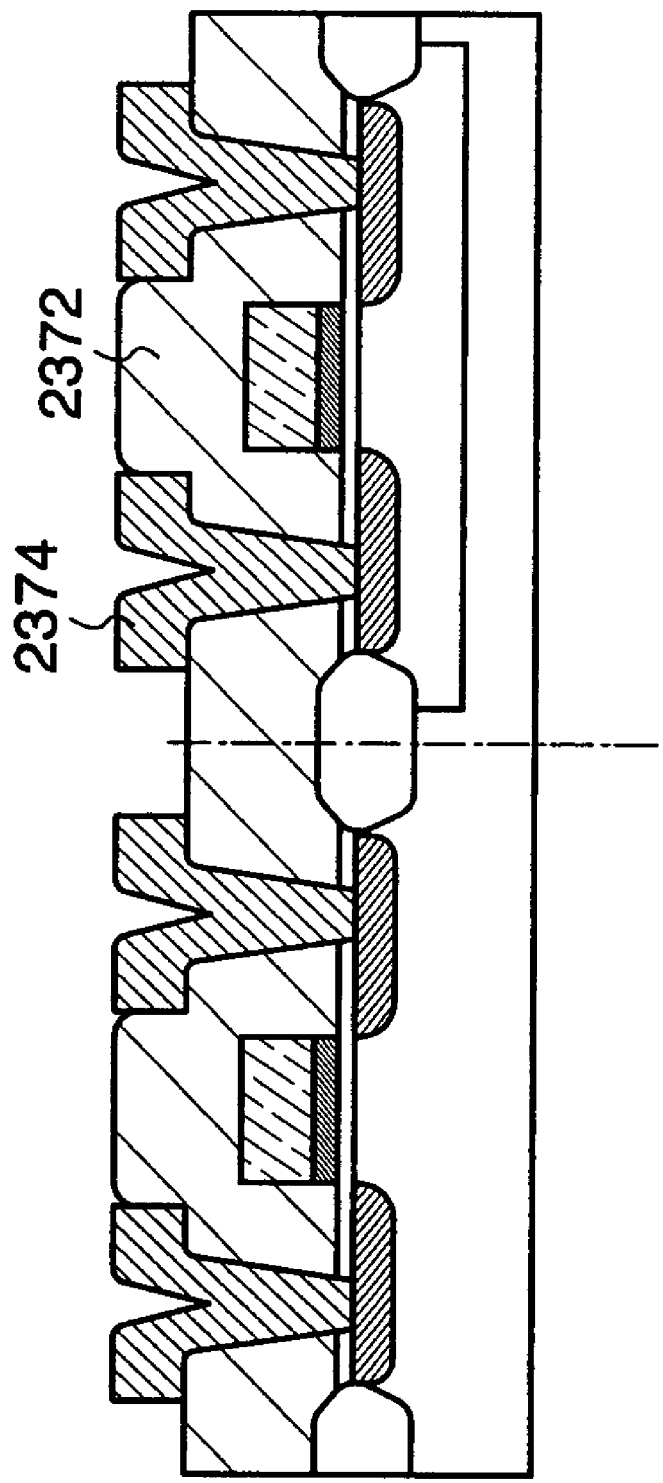
FIG. 19 shows an example of a manufacturing method of a semiconductor device of the invention.

Next, a second insulating film 2372 is formed to cover the insulating films 2332 and 2334 and the gate electrodes 2340 and 2342, and a conductive film 2374 electrically connected to the impurity regions 2352 and 2370 formed in the regions 2304 and 2306 respectively is formed over the second insulating film 2372 (see FIG. 19).

The second insulating film 2372 can have a single-layer structure or a stacked-layer structure using an insulating film containing oxygen or nitrogen, such as silicon oxide (SiOx), silicon nitride (SiNx), silicon oxynitride (SiOxNy) (x>y), or silicon nitride oxide (SiNxOy) (x>y); a film containing carbon such as DLC (Diamond Like Carbon); an organic material such as epoxy, polyimide, polyamide, polyvinyl phenol, benzocyclobutene, or acrylic; or a siloxane material such as a siloxane resin, by a CVD method, a sputtering method, or the like. Note that a siloxane material corresponds to a material having Si—O—Si bonds. Siloxane has a skeleton structure formed of a bond of silicon (Si) and oxygen (0). As a substituent, an organic group (e.g., an alkyl group or aromatic hydrocarbon) containing at least hydrogen is used. Alternatively, a fluoro group, or an organic group containing at least hydrogen and a fluoro group may be used as a substituent.

The conductive film 2374 is formed to have a single-layer structure or a stacked-layer structure using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing the above-described element as its main component, by a CVD method, a sputtering method, or the like. An alloy material containing aluminum as its main component corresponds to, for example, a material which contains aluminum as its main component and also contains nickel; or an alloy material which contains aluminum as its main component and also contains nickel and one or both of carbon and silicon. The conductive film 2374 preferably employs, for example, a stacked-layer structure of a barrier film, an aluminum-silicon (Al—Si) film, and a barrier film; or a stacked-layer structure of a barrier film, an aluminum-silicon (Al—Si) film, a titanium nitride film, and a barrier film. Note that a barrier film corresponds to a thin film formed of titanium, nitride of titanium, molybdenum, or nitride of molybdenum. Since aluminum and aluminum silicon have low resistance and are inexpensive, they are optimum materials for forming the conductive film 2374. In addition, when upper and lower barrier layers are provided, generation of hillocks of aluminum or aluminum silicon can be prevented. Further, when a barrier film is formed of titanium which is a highly-reducible element, even if a thin natural oxide film is formed on the crystalline semiconductor film, the natural oxide film is reduced so that preferable contact with the crystalline semiconductor film can be obtained.

Through the above-described steps, a semiconductor device which includes a p-channel transistor formed in the region 2304 of the semiconductor substrate 2300 and an n-channel transistor formed in the region 2306 and of which operational reliability is improved can be obtained.

Note that a structure of each transistor for forming a semiconductor device of the invention is not limited to the structure shown in the drawing. For example, a transistor may have an inversely staggered structure or a FinFET structure. It is preferable to have a FinFET structure since a short channel effect due to miniaturization of transistor size can be suppressed.

Embodiment 5

In this embodiment, a manufacturing method of a semiconductor device, which is different from the aforementioned embodiment, is described with reference to FIGS. 20A to 20C, 21A to 21C, 22A to 22C, and 23A and 23B. Specifically, an example is described, in which a MOS transistor is formed by a manufacturing method different from that in Embodiment 4.

First, an insulating film is formed on a semiconductor substrate 2600. Here, a single crystalline Si substrate having n-type conductivity is used as the semiconductor substrate 2600, and an insulating film 2602 and an insulating film 2604 are formed on the semiconductor substrate 2600 (see FIG. 20A). For example, a silicon oxide (SiOx) film is formed as the insulating film 2602 by performing heat treatment on the semiconductor substrate 2600, and a silicon nitride (SiNx) film is formed as the insulating film 2604 on the insulating film 2602 by a CVD method.

Any semiconductor substrate can be used as the semiconductor substrate 2600. For example, a single crystalline Si substrate having n-type conductivity or p-type conductivity, a compound semiconductor substrate (e.g., a GaAs substrate, an InP substrate, a GaN substrate, a SiC substrate, a sapphire substrate, or a ZnSe substrate), an SOI (Silicon On Insulator) substrate formed using a bonding method or a SIMOX (Separation by IMplanted OXygen) method, or the like can be used.

Alternatively, after the insulating film 2602 is formed, the insulating film 2602 may be nitrided by high-density plasma treatment so that the insulating film 2604 is formed. Note that the insulating film provided on the semiconductor substrate 2600 may have a single-layer structure or a stacked-layer structure of three or more layers.

Figure 20A:
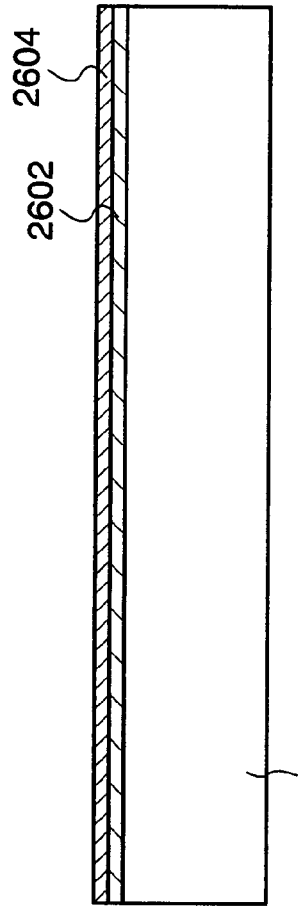
FIGS. 20A to 20C show an example of a manufacturing method of a semiconductor device of the invention.
Figure 20B:
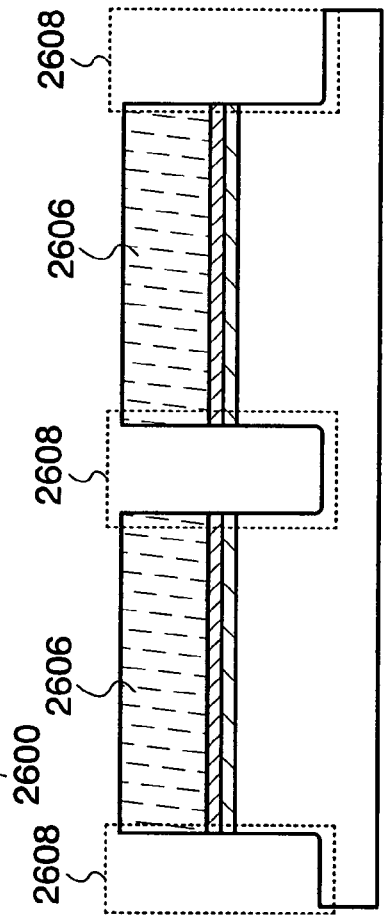

Next, a pattern of a resist mask 2606 is selectively formed over the insulating film 2604, and etching is selectively performed using the resist mask 2606 as a mask, whereby depressions 2608 are selectively formed in the semiconductor substrate 2600 (see FIG. 20B). Dry etching utilizing plasma can be performed as etching of the semiconductor substrate 2600 and the insulating films 2602 and 2604.

Figure 20C:
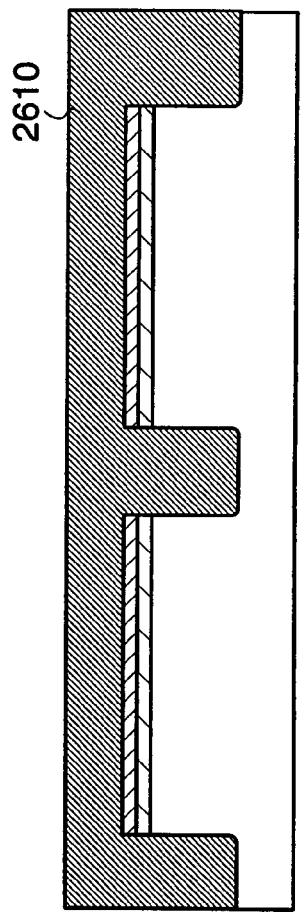

Next, after the pattern of the resist mask 2606 is removed, an insulating film 2610 is formed to fill the depressions 2608 formed in the semiconductor substrate 2600 (see FIG. 20C).

The insulating film 2610 is formed using an insulating material such as silicon oxide, silicon nitride, silicon oxynitride (SiOxNy) (x>y>0), or silicon nitride oxide (SiNxOy) (x>y>0), by a CVD method, a sputtering method, or the like. Here, as the insulating film 2610, a silicon oxide film is formed using a TEOS (tetraethyl orthosilicate) gas by an atmospheric pressure CVD method or a low pressure CVD method.

Next, a surface of the semiconductor substrate 2600 is exposed by grinding treatment, polishing treatment, or CMP (Chemical Mechanical Polishing) treatment. Here, by exposure of the surface of the semiconductor substrate 2600, regions 2612 and 2613 are each provided between insulating films 2611 formed in the depressions 2608 of the semiconductor substrate 2600. Note that the insulating films 2611 are obtained by removal of the insulating film 2610 formed on the surface of the semiconductor substrate 2600 by grinding treatment, polishing treatment, or CMP treatment. Then, a p-type impurity element is selectively introduced, whereby a p-well 2615 is formed in the region 2613 of the semiconductor substrate 2600 (see FIG. 21A).

As the p-type impurity element, boron (B), aluminum (Al), gallium (Ga), or the like can be used. Here, as the impurity element, boron (B) is introduced into the region 2613.

Note that in this embodiment, an impurity element is not introduced into the region 2612 since the semiconductor substrate having n-type conductivity is used as the semiconductor substrate 2600; however, an n-well may be formed in the region 2612 by introducing an n-type impurity element. As the n-type impurity element, phosphorus (P), arsenic (As), or the like can be used.

On the other hand, when the semiconductor substrate having p-type conductivity is used, a structure may be employed where an n-well is formed by introducing the n-type impurity element into the region 2612 and an impurity element is not introduced into the region 2613.

Figure 21A:
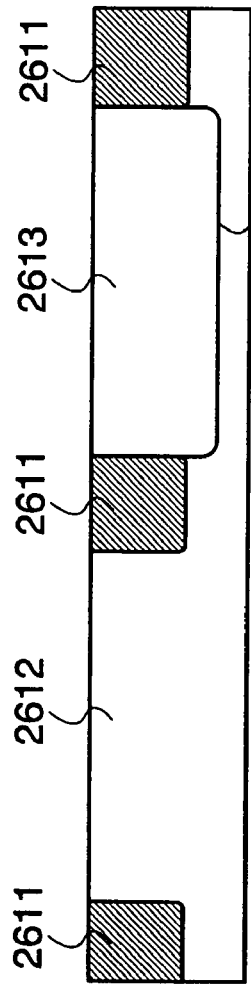
FIGS. 21A to 21C show an example of a manufacturing method of a semiconductor device of the invention.
Figure 21B:
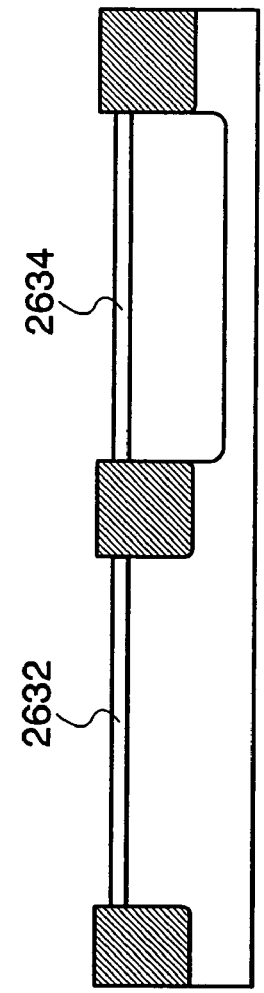

Next, insulating films 2632 and 2634 are formed on surfaces of the regions 2612 and 2613 of the semiconductor substrate 2600, respectively (see FIG. 21B).

The insulating films 2632 and 2634 can be formed of, for example, silicon oxide films by oxidizing the surfaces of the regions 2612 and 2613 provided in the semiconductor substrate 2600 by heat treatment. Alternatively, the insulating films 2632 and 2634 may have a stacked-layer structure of a silicon oxide film and a silicon oxynitride film by forming a silicon oxide film by a thermal oxidation method and then nitriding a surface of the silicon oxide film by nitridation treatment.

Alternatively, the insulating films 2632 and 2634 may by formed using the aforementioned plasma treatment. For example, oxidation treatment or nitridation treatment is performed on the surfaces of the regions 2612 and 2613 provided in the semiconductor substrate 2600 by the aforementioned high-density plasma treatment, whereby silicon oxide (SiOx) films or silicon nitride (SiNx) films can be formed as the insulating films 2632 and 2634. Further, after oxidation treatment is performed on the surfaces of the regions 2612 and 2613 by high-density plasma treatment, nitride treatment may be performed by high-density plasma treatment again. In this case, silicon oxide films are formed in contact the surfaces of the regions 2612 and 2613 and silicon oxynitride films are formed over the silicon oxide films, whereby each of the insulating films 2632 and 2634 has a stacked-layer structure of the silicon oxide film and the silicon oxynitride film. Further, after silicon oxide films are formed on the surfaces of the regions 2612 and 2613 by a thermal oxidation method, oxidation treatment or nitridation treatment may be performed by high-density plasma treatment.

Note that the insulating films 2632 and 2634 formed in the regions 2612 and 2613 of the semiconductor substrate 2600 function as gate insulating films in transistors to be completed later.

Figure 21C:
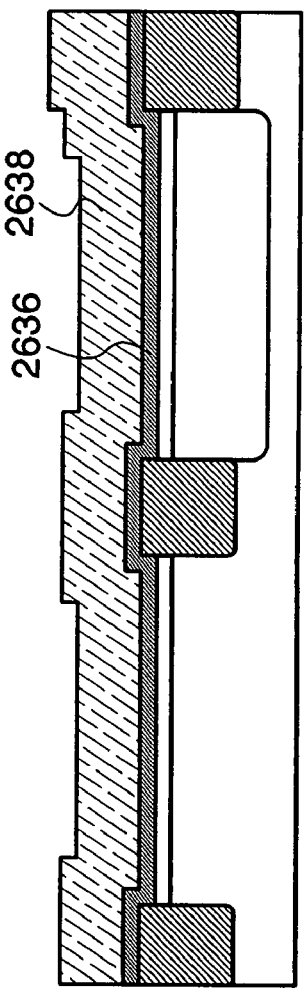

Next, a conductive film is formed to cover the insulating films 2632 and 2634 formed above the regions 2612 and 2613 provided in the semiconductor substrate 2600 (see FIG. 21C). Here, an example is shown in which a conductive film 2636 and a conductive film 2638 are sequentially stacked to form the conductive film. It is needless to say that the conductive film may be a single-layer structure or a stacked-layer structure of three or more layers.

The conductive films 2636 and 2638 can be formed of an element selected from tantalum (Ta), tungsten (W), titanium (Ti), molybdenum (Mo), aluminum (Al), copper (Cu), chromium (Cr), niobium (Nb), and the like, or an alloy material or a compound material containing the above-described element as its main component. Alternatively, the conductive films 2636 and 2638 can be formed of a metal nitride film obtained by nitriding the above-described element or a semiconductor material typified by polycrystalline silicon doped with an impurity element such as phosphorus.

Here, the conductive film 2636 is formed using tantalum nitride and the conductive film 2638 is formed thereover using tungsten so that a stacked-layer structure is provided. Alternatively, as the conductive film 2636, a single layer or a stacked layer of tantalum nitride, tungsten nitride, molybdenum nitride, and/or titanium nitride can be used. As the conductive film 2638, a single layer or a stacked layer of tungsten, tantalum, molybdenum, or titanium can be used.

Figure 22A:
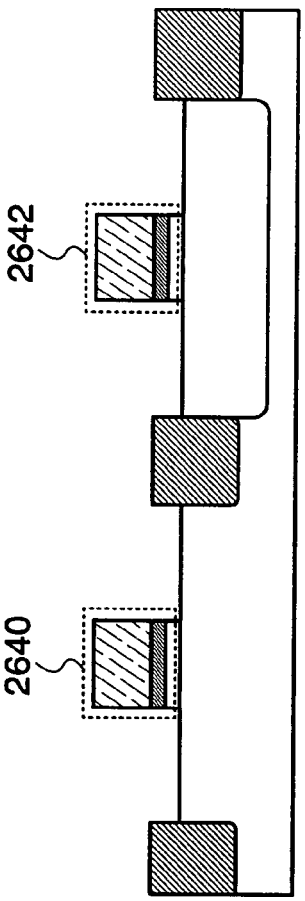
FIGS. 22A to 22C show an example of a manufacturing method of a semiconductor device of the invention.

Next, the stacked conductive films 2636 and 2638 are selectively removed by etching, whereby the conductive films 2636 and 2638 partially remain above the regions 2612 and 2613 of the semiconductor substrate 2600 to form conductive films 2640 and 2642 functioning as gate electrodes, respectively (see FIG. 22A). Here, in the semiconductor substrate 2600, surfaces of the regions 2612 and 2613, which do not overlap with the conductive films 2640 and 2642, are made exposed.

Specifically, in the region 2612 of the semiconductor substrate 2600, a part of the insulating film 2632 formed below the conductive film 2640, which does not overlap with the conductive film 2640, is selectively removed so that ends of the conductive film 2640 and the insulating film 2632 are roughly aligned with each other. Further, in the region 2613 of the semiconductor substrate 2600, a part of the insulating film 2634 formed below the conductive film 2642, which does not overlap with the conductive film 2642, is selectively removed so that ends of the conductive film 2642 and the insulating film 2634 are roughly aligned with each other.

In this case, parts of the insulating films and the like which do not overlap with the conductive films 2640 and 2642 may be removed at the same time as the formation of the conductive films 2640 and 2642, or they may be removed using the remaining resist mask or the conductive films 2640 and 2642 as masks after the conductive films 2640 and 2642 are formed.

Figure 22B:
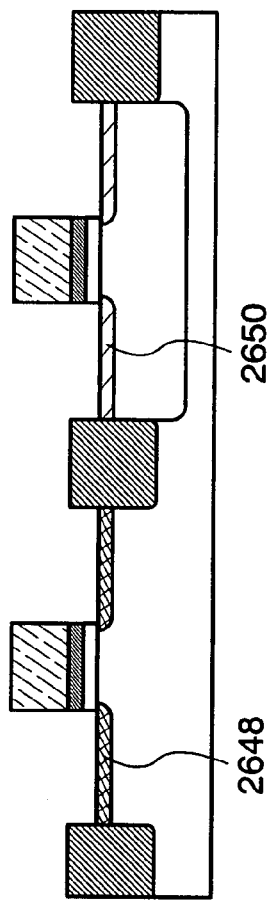

Next, impurity elements are selectively introduced into the regions 2612 and 2613 of the semiconductor substrate 2600, so that impurity regions 2648 and 2650 are formed (see FIG. 22B). Here, an impurity element imparting n-type conductivity is selectively introduced into the region 2613 at a low concentration, using the conductive film 2642 as a mask to form the impurity region 2650. An impurity element imparting p-type conductivity is selectively introduced into the region 2612 at a low concentration, using the conductive film 2640 as a mask to form the impurity region 2648. As the impurity element imparting n-type conductivity, phosphorus (P), arsenic (As), or the like can be used. As the impurity element imparting p-type conductivity, boron (B), aluminum (Al), gallium (Ga), or the like can be used. A part of the impurity regions 2648 and 2650 formed here forms LDD (Lightly Doped Drain) regions to be formed later.

Next, insulating films 2654 are formed in contact with side surfaces of the conductive films 2640 and 2642. The insulating film 2654 is also referred to as a sidewall. The insulating film 2654 is formed to have a single-layer structure or a stacked-layer structure using a film including an inorganic material such as silicon, oxide of silicon, or nitride of silicon; or a film including an organic material such as an organic resin, by a plasma CVD method, a sputtering method, or the like. Then, the insulating film is selectively etched by anisotropic etching mainly in a perpendicular direction, so that the insulating film can be formed in contact with each side surface of the conductive films 2640 and 2642. Note that the insulating films 2654 are used as masks for doping when LDD (Lightly Doped Drain) regions are formed. Here, the insulating films 2654 are formed also to be in contact with side surfaces of the insulating films formed below the conductive films 2640 and 2642.

Figure 22C:
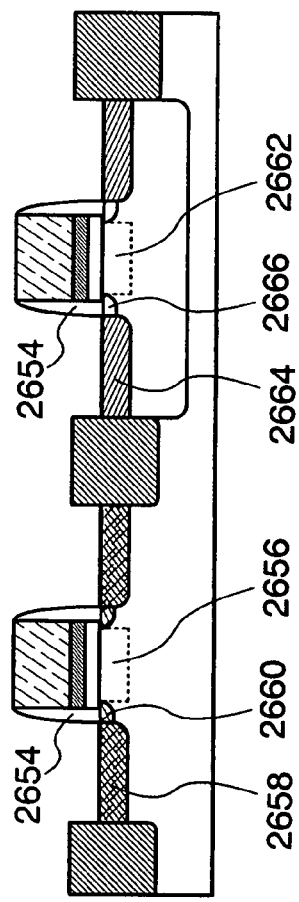

Then, impurity elements are introduced into the regions 2612 and 2613 of the semiconductor substrate 2600, using the insulating films 2654 and the conductive films 2640 and 2642 as masks, so that impurity regions each functioning as a source region or a drain region are formed (see FIG. 22C). Here, an impurity element imparting n-type conductivity is introduced into the region 2613 of the semiconductor substrate 2600 at a high concentration, using the insulating films 2654 and the conductive film 2642 as masks. An impurity element imparting p-type conductivity is introduced into the region 2612 at a high concentration, using the insulating films 2654 and the conductive film 2640 as masks.

As a result, in the region 2612 of the semiconductor substrate 2600, impurity regions 2658 forming a source region and a drain region, low concentration impurity regions 2660 forming LDD regions, and a channel forming region 2656 are formed. In the region 2613 of the semiconductor substrate 2600, impurity regions 2664 forming a source region and a drain region, low concentration impurity regions 2666 forming LDD regions, and a channel forming region 2662 are formed.

Note that in this embodiment, the impurity elements are introduced in a state where parts of the regions 2612 and 2613 of the semiconductor substrate 2600, which do not overlap with the conductive films 2540 and 2642, are exposed. Thus, the channel forming regions 2656 and 2662 formed in the regions 2612 and 2613 of the semiconductor substrate 2600, respectively can be formed in a self-aligned manner with the conductive films 2640 and 2642.

Figure 23A:
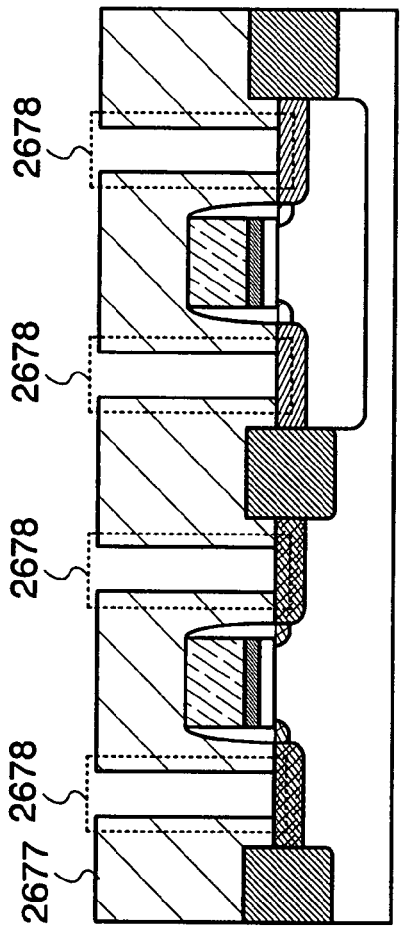
FIGS. 23A and 23B show an example of a manufacturing method of a semiconductor device of the invention.
Figure 23B:
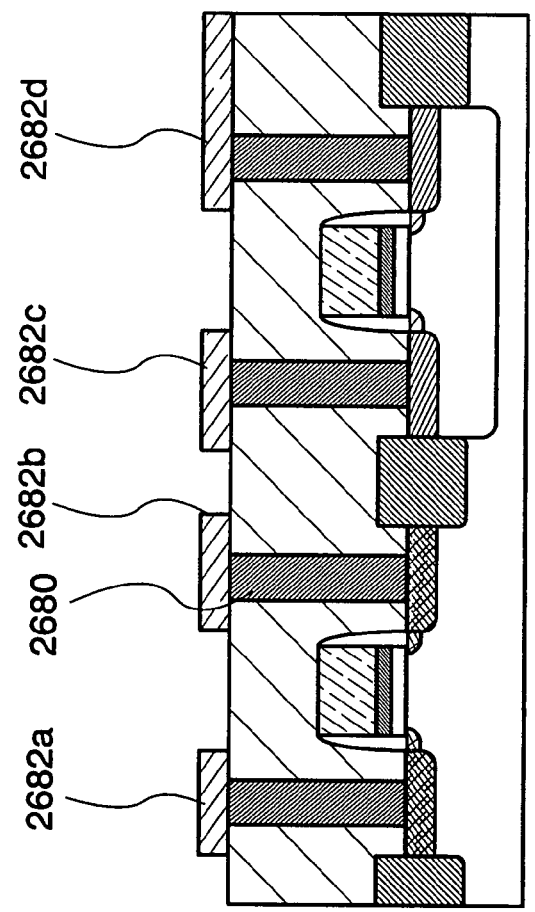

Next, a second insulating film 2677 is formed to cover the insulating films, the conductive films, and the like provided over the regions 2612 and 2613 of the semiconductor substrate 2600, and openings 2678 are formed in the insulating film 2677 (see FIG. 23A).

The second insulating film 2677 can have a single-layer structure or a stacked-layer structure using an insulating film containing oxygen or nitrogen, such as silicon oxide (SiOx), silicon nitride (SiNx), silicon oxynitride (SiOxNy) (x>y), or silicon nitride oxide (SiNxOy) (x>y); a film containing carbon such as DLC (Diamond Like Carbon); an organic material such as epoxy, polyimide, polyamide, polyvinyl phenol, benzocyclobutene, or acrylic; or a siloxane material such as a siloxane resin, by a CVD method, a sputtering method, or the like. Note that a siloxane material corresponds to a material having Si—O—Si bonds. Siloxane has a skeleton structure formed of a bond of silicon (Si) and oxygen (O). As a substituent, an organic group (e.g., an alkyl group or aromatic hydrocarbon) containing at least hydrogen is used. Alternatively, a fluoro group, or an organic group containing at least hydrogen and a fluoro group may be used as a substituent.

Next, conductive films 2680 are formed in the openings 2678 by a CVD method. Then, conductive films 2682a, 2682b, 2682c, and 2682d are selectively formed over the insulating film 2677 to be electrically connected to the conductive films 2680 (see FIG. 23B).

The conductive films 2680 and 2682a to 2682d are formed to have a single-layer structure or a stacked-layer structure using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing the above-described element as its main component, by a CVD method, a sputtering method, or the like. An alloy material containing luminum as its main component corresponds to, for example, a material which contains aluminum as its main component and also contains nickel; or an alloy material which contains aluminum as its main component and also contains nickel and one or both of carbon and silicon. The conductive films 2680 and 2682a to 2682d preferably employ, for example, a stacked-layer structure of a barrier film, an aluminum-silicon (Al—Si) film, and a barrier film; or a stacked-layer structure of a barrier film, an aluminum-silicon (Al—Si) film, a titanium nitride film, and a barrier film. Note that a barrier film corresponds to a thin film formed of titanium, nitride of titanium, molybdenum, or nitride of molybdenum. Since aluminum and aluminum silicon have low resistance and are inexpensive, they are optimum materials for forming the conductive films. In addition, when upper and lower barrier layers are provided, generation of hillocks of aluminum or aluminum silicon can be prevented. Further, when a barrier film is formed of titanium which is a highly-reducible element, even if a thin natural oxide film is formed on an element region provided in a semiconductor substrate, the natural oxide film is reduced so that preferable contact with the element region provided in the semiconductor substrate can be obtained. Here, the conductive films 2680 can be formed using tungsten (W) by a CVD method.

Through the above-described steps, a semiconductor device which includes a p-channel transistor formed in the region 2612 of the semiconductor substrate 2600 and an n-channel transistor formed in the region 2613 and of which operational reliability is improved can be obtained.

Note that a structure of each transistor for forming a semiconductor device of the invention is not limited to the structure shown in the drawing. For example, a transistor may have an inversely staggered structure or a FinFET structure. It is preferable to have a FinFET structure since a short channel effect due to miniaturization of transistor size can be suppressed.

Embodiment 6

In this embodiment, use of a semiconductor device of the invention, which transmits and receives data by wireless communication, is described. The semiconductor device of the invention can be provided for, for example, bills, coins, securities, bearer bonds, documents (e.g., driver's licenses or resident's cards), packaging containers (e.g., wrapping paper or bottles), storage media (e.g., DVD software or video tapes), vehicles (e.g., bicycles), personal belongings (e.g., bags or glasses), foods, plants, animals, human bodies, clothing, everyday articles, or tags on goods such as electronic appliances or on packs. An electronic appliance includes a liquid crystal display device, an EL display device, a television set (also simply called a TV set, a TV receiver, or a television receiver), a mobile phone, and the like.

In this embodiment, an application of the invention and an example of a commercial product to which the invention is applied are described with reference to FIGS. 9A to 9E.

Figure 9A:
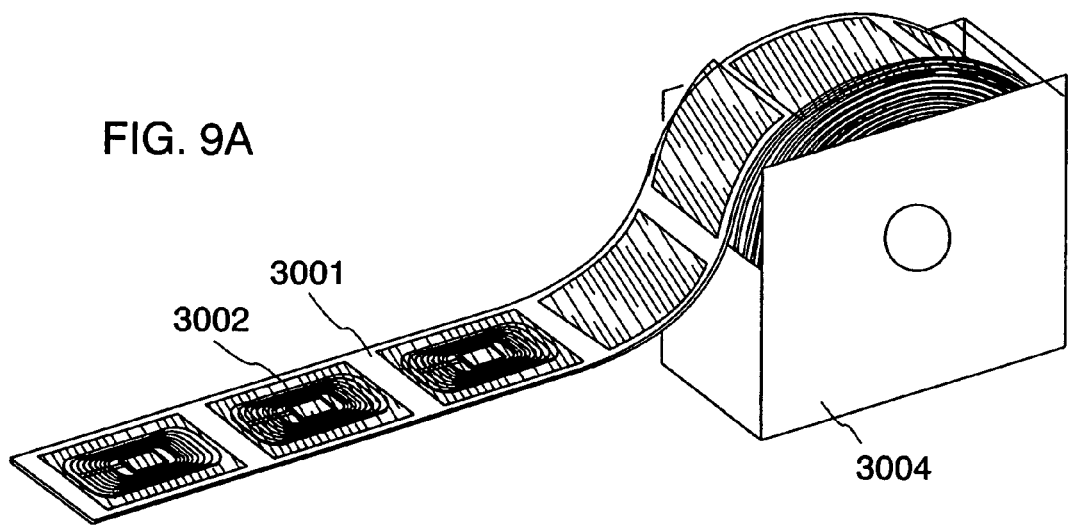
FIGS. 9A to 9E each show an application of a semiconductor device of the invention.

FIG. 9A shows an example of a state of completed products of a semiconductor device according to the invention. A semiconductor device 3002 of the invention is formed over a label board 3001 (separate paper). The semiconductor device 3002 formed over the label board 3001 is put in a box 3004. On the semiconductor device 3002, information on a commercial product or service (e.g., a name of the product, a brand, a trademark, a trademark owner, a seller, or a manufacturer) is written. In addition, an ID number which is specific to the commercial product (or the kind of the commercial product) is assigned to the semiconductor device 3002, so that forgery, infringement of intellectual property rights such as a patent and a trademark, and illegality such as unfair competition can be easily figured out. Further, a lot of information which is too much to write clearly on a container or a label of the commercial product, for example, production area, selling area, quality, raw material, efficacy, use, quantity, shape, price, production method, directions for use, production time, time of the use, expiration date, instructions of the commercial product, information on the intellectual property of the commercial product, and the like can be input in the semiconductor device; thus, a trader and a consumer can access the information by a simple wireless communication means having a read function, such as a reader. The producer can also easily rewrite or delete the information, while the trader and the consumer are not allowed to rewrite or delete the information.

Figure 9B:
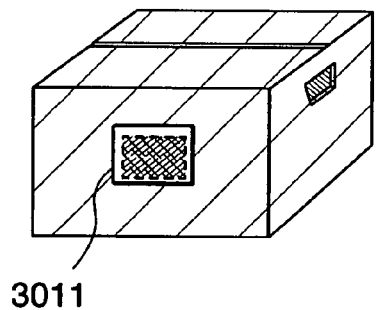

FIG. 9B shows an example where a product is provided with a semiconductor device 3012 of the invention. When the product is provided with the semiconductor device 3012 of the invention, information on the product can be easily accessed, so that management of the product becomes easier. For example, when the product is stolen, the thief can be figured out quickly by tracing the pathway of the product. In this manner, products which are superior in so-called traceability can be distributed by being provided with the semiconductor device of the invention. By providing the highly reliable semiconductor device of the invention, malfunction of the semiconductor device can be suppressed, and product management can be performed more accurately.

Figure 9C:
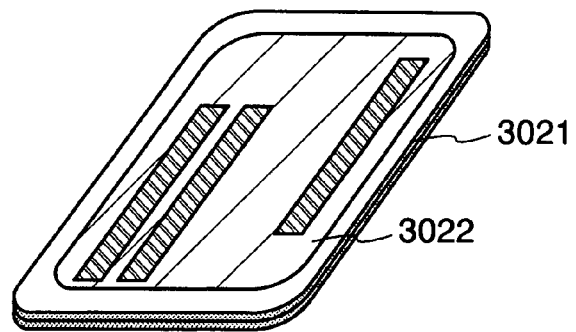

FIG. 9C shows an example of a state of a completed product of an ID card 3021 including a semiconductor device 3022 of the invention. The ID card 3021 includes all kinds of cards such as a cash card, a credit card, a prepaid card, an electronic train ticket, electronic money, a telephone card, and a membership card. When the semiconductor device of the invention is included in such a card, malfunction of the card can be prevented. Thus, reliability of the card can be improved.

Figure 9D:
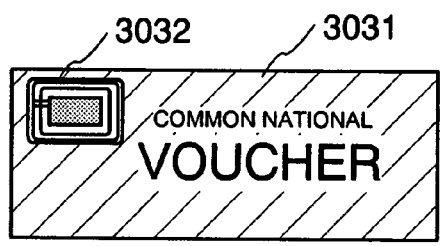

FIG. 9D shows a state of a completed product of a bearer bond 3031. A semiconductor device 3032 is embedded in the bearer bond 3031 and is protected by a resin formed in the periphery thereof. Here, the resin is filled with a filler. Note that the aforementioned bearer bond includes stamps, tickets, admission tickets, merchandise coupons, book coupons, stationery coupons, beer coupons, rice coupons, various gift coupons, various service coupons, and the like. It is needless to say that it is not limited thereto. In addition, when the semiconductor device 3032 of the invention is provided for bills, coins, securities, bearer bonds, documents, or the like, an authentication function can be provided; thus, forgery can be prevented by use of the authentication function. Further, when the semiconductor device with improved reliability of the invention is embedded in such a bearer bond, reliability of the authentication function can also be improved.

Figure 9E:
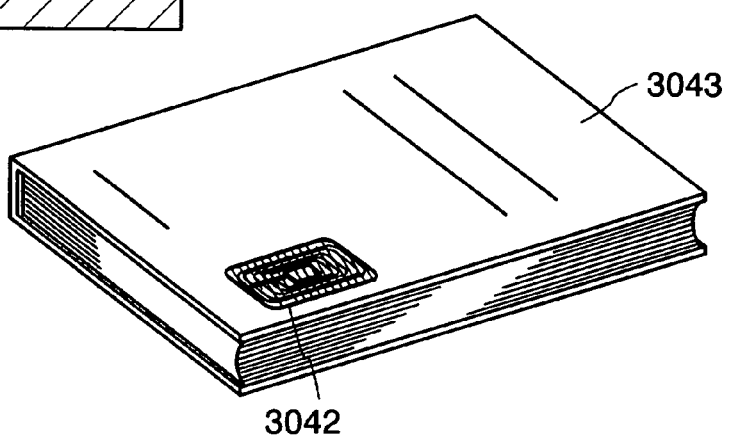

FIG. 9E shows a book 3043 to which a semiconductor device 3042 of the invention is attached. The semiconductor device 3042 of the invention is fixed to goods by, for example, being attached to a surface or embedded therein. As shown in FIG. 9E, the semiconductor device 3042 can be embedded in paper of a book or in an organic resin itself of a package formed of the organic resin. Since the semiconductor device 3042 of the invention can realize a small size, a thin shape, and light weight, it can be fixed to goods without spoiling the design thereof. Further, when the semiconductor device of the invention, which can prevent a malfunction, is provided, management of the book or the like can be performed accurately.

In addition, although not shown here, the efficiency of a system such as an inspection system can be improved by providing the semiconductor device of the invention for, for example, packaging containers, storage media, personal belongings, foods, clothing, everyday articles, electronic appliances, or the like. In addition, individual creatures such as animals can be easily identified by being implanted with the semiconductor device of the invention. For example, year of birth, sex, breed, and the like can be easily identified by implantation of the semiconductor device of the invention, which transmits and receives data by a radio signal, in creatures such as domestic animals. Further, since the semiconductor device of the invention can prevent a malfunction, inspection, identification, or the like can be performed more accurately.

As described above, a semiconductor device of the invention can be provided for any goods (including creatures).

This embodiment can be freely combined with the aforementioned embodiment mode and embodiments.

This application is based on Japanese Patent Application serial No. 2006-178934 filed in Japan Patent Office on Jun. 29, 2006, the entire contents of which are hereby incorporated by reference.

What is claimed is:

1. A semiconductor device comprising:
   an antenna circuit which transmits and receives a radio signal;
   a transmission circuit;
   a reception circuit; and
   an arithmetic processing circuit,
   wherein the transmission circuit outputs to the reception circuit a signal showing whether or not the antenna circuit is transmitting the radio signal, and
   wherein the reception circuit outputs to the arithmetic processing circuit a signal showing that the antenna circuit does not receive the radio signal regardless of a signal from the antenna circuit, when a signal showing that the antenna circuit is transmitting the radio signal is input from the transmission circuit.

2. The semiconductor device according to claim 1, wherein a part of the antenna circuit, a part of the transmission circuit, a part of the reception circuit, or a part of the arithmetic processing circuit includes a thin film transistor formed over a substrate having an insulating surface.

3. The semiconductor device according to claim 1, wherein the antenna circuit includes an antenna, a resonant capacitor, a modulation resistor, and a rectifier circuit.

4. The semiconductor device according to claim 3, wherein the antenna circuit has a coil antenna or a dipole antenna.

5. The semiconductor device according to claim 3, wherein the modulation resistor includes an n-channel transistor or a p-channel transistor.

6. The semiconductor device according to claim 3, wherein the rectifier circuit has a full-wave rectifier circuit or a half-wave rectifier circuit.

7. The semiconductor device according to claim 1, wherein the semiconductor device is one selected from the group consisting of an RF chip, an RFID tag, a wireless tag, an ID tag, an IC tag, and an RF tag.

8. A semiconductor device comprising:
   an antenna circuit which inputs a modulation signal, outputs a rectified signal, and transmits and receives a radio signal;
   a reception circuit which inputs the rectified signal and a state signal, and outputs a demodulation signal;
   a transmission circuit which inputs a transmitted data, and outputs the state signal and the modulation signal; and
   an arithmetic processing circuit which inputs the demodulation signal and outputs the transmitted data,
   wherein the reception circuit includes a low-pass filter and an OR circuit, and
   wherein the rectified signal is input to a first input of the OR circuit through the low-pass filter, and the state signal is input to a second input of the OR circuit, and the demodulation signal is output from the OR circuit.

9. The semiconductor device according to claim 8, wherein a part of the antenna circuit, a part of the transmission circuit, a part of the reception circuit, or a part of the arithmetic processing circuit includes a thin film transistor formed over a substrate having an insulating surface.

10. The semiconductor device according to claim 8, wherein the semiconductor device is one selected from the group consisting of an RF chip, an RFID tag, a wireless tag, an ID tag, an IC tag, and an RF tag.

11. A semiconductor device comprising:
    an antenna circuit which inputs a modulation signal, outputs a rectified signal, and transmits and receives a radio signal;
    a reception circuit which inputs the rectified signal and a state signal, and outputs a demodulation signal;

a transmission circuit which inputs a transmitted data, and outputs the state signal and the modulation signal; and an arithmetic processing circuit which inputs the demodulation signal and outputs the transmitted data, wherein the reception circuit generates the demodulation signal in which the rectified signal is demodulated when the antenna circuit does not transmit the radio signal, and wherein the reception circuit generates the demodulation signal regardless of the rectified signal when the antenna circuit transmits the radio signal.

12. The semiconductor device according to claim 11, wherein a part of the antenna circuit, a part of the transmission circuit, a part of the reception circuit, or a part of the arithmetic processing circuit includes a thin film transistor formed over a substrate having an insulating surface.

13. The semiconductor device according to claim 11, wherein the semiconductor device is one selected from the group consisting of an RF chip, an RFID tag, a wireless tag, an ID tag, an IC tag, and an RF tag.

14. A semiconductor device comprising:

an antenna circuit which inputs a modulation signal, outputs a rectified signal, and transmits and receives a radio signal;

a reception circuit which inputs the rectified signal and a state signal, and outputs a demodulation signal;

a transmission circuit which inputs a transmitted data, and outputs the state signal and the modulation signal; and an arithmetic processing circuit which inputs the demodulation signal and outputs the transmitted data, wherein the reception circuit includes a low-pass filter and an OR circuit, wherein the rectified signal is input to a first input of the OR circuit through the low-pass filter, and the state signal is input to a second input of the OR circuit, and the demodulation signal is output from the OR circuit, wherein the reception circuit generates the demodulation signal in which the rectified signal is demodulated when the antenna circuit does not transmit the radio signal, and wherein the reception circuit generates the demodulation signal regardless of the rectified signal when the antenna circuit transmits the radio signal.

15. The semiconductor device according to claim 14, wherein a part of the antenna circuit, a part of the transmission circuit, a part of the reception circuit, or a part of the arithmetic processing circuit includes a thin film transistor formed over a substrate having an insulating surface.

16. The semiconductor device according to claim 14, wherein the semiconductor device is one selected from the group consisting of an RF chip, an RFID tag, a wireless tag, an ID tag, an IC tag, and an RF tag.

17. A semiconductor device comprising:

an antenna circuit including a resonant capacitor, a modulation resistor and a rectifier circuit;

a reception circuit including a low-pass filter and an OR circuit;

a transmission circuit including a transmission data register, a modulation signal generation circuit and a timing controller; and an arithmetic processing circuit, wherein the rectifier circuit is electrically connected to an input of the low-pass filter, wherein an output of the low-pass filter is electrically connected to a first input of the OR circuit, wherein a first output of the transmission data register is electrically connected to a first input of the modulation signal generation circuit, wherein an output of the timing controller is electrically connected to a second input of the modulation signal generation circuit, and wherein an output of the modulation signal generation circuit is electrically connected to an input of the modulation resistor.

18. The semiconductor device according to claim 17, wherein a part of the antenna circuit, a part of the transmission circuit, a part of the reception circuit, or a part of the arithmetic processing circuit includes a thin film transistor formed over a substrate having an insulating surface.

19. The semiconductor device according to claim 17, wherein the semiconductor device is one selected from the group consisting of an RF chip, an RFID tag, a wireless tag, an ID tag, an IC tag, and an RF tag.

20. A semiconductor device comprising:

an antenna circuit which inputs a modulation signal, outputs a rectified signal, and transmits and receives a radio signal;

a reception circuit which inputs the rectified signal and a state signal, and outputs a demodulation signal;

a transmission circuit which inputs a transmitted data, and outputs the state signal and the modulation signal; and an arithmetic processing circuit which inputs the demodulation signal and outputs the transmitted data, wherein the state signal is a signal which shows whether the antenna circuit transmits the radio signal or not.

21. The semiconductor device according to claim 20, wherein a part of the antenna circuit, a part of the transmission circuit, a part of the reception circuit, or a part of the arithmetic processing circuit includes a thin film transistor formed over a substrate having an insulating surface.

22. The semiconductor device according to claim 20, wherein the semiconductor device is one selected from the group consisting of an RF chip, an RFID tag, a wireless tag, an ID tag, an IC tag, and an RF tag.

* * * * *